United States Patent
Wei et al.

(10) Patent No.: US 9,671,035 B2
(45) Date of Patent: Jun. 6, 2017

(54) FLOW REGULATOR

(71) Applicant: INDUSTRIAL TECHNOLOGY RESEARCH INSTITUTE, Hsin-Chu (TW)

(72) Inventors: Shih-Jie Wei, Taichung (TW); Hua-Chih Huang, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 32 days.

(21) Appl. No.: 14/583,426

(22) Filed: Dec. 26, 2014

(65) Prior Publication Data

US 2016/0018824 A1   Jan. 21, 2016

(30) Foreign Application Priority Data

Jul. 18, 2014   (TW) .............................. 103124749 A

(51) Int. Cl.
*F16K 31/12* (2006.01)
*G05D 16/10* (2006.01)
*G05D 7/01* (2006.01)

(52) U.S. Cl.
CPC ........... *F16K 31/12* (2013.01); *G05D 7/0133* (2013.01); *G05D 16/103* (2013.01)

(58) Field of Classification Search
CPC .. G05D 16/103; G05D 7/1033; F16K 17/044; F16K 17/06; F16K 31/1221; F16K 31/12

(Continued)

(56) References Cited

U.S. PATENT DOCUMENTS 217,745 A  *  7/1879  Robb .................. F16K 17/0433
                                                  137/469
4,022,113 A  *  5/1977  Blatt ....................... F16K 15/02
                                                  137/513.5

(Continued)

FOREIGN PATENT DOCUMENTS

| CN | 202091576 U | 12/2011 |
| CN | 103047291 A | 4/2013 |
| CN | 103185005 A | 7/2013 |
| CN | 103591317 A | 2/2014 |

(Continued)

OTHER PUBLICATIONS

Intellectual Property Office, Ministry of Economic Affairs, R.O.C., "Office Action", Oct. 12, 2016, Taiwan.

(Continued)

*Primary Examiner* — Craig Schneider
*Assistant Examiner* — P. Macade Nichols
(74) *Attorney, Agent, or Firm* — Locke Lord LLP; Tim Tingkang Xia, Esq.

(57) ABSTRACT

The present disclosure provides a flow regulator capable of regulating flow resistance of a fluid by adjusting helical pitch of the flow regulator. The flow regulator comprises: a channel, a rod, and a helical coil. The channel has a fluid inlet and a fluid outlet for a fluid flowing in and out of the flow regulator, respectively. The rod has a fore end and a rear end opposite to each other. The fore end is inside the channel, and the rear end is closer to the fluid outlet than the fluid inlet. The helical coil winds around the rod, and the helical pitch of the helical coil is adjustable for regulating flow resistance of the fluid. The channel further has a narrowed section where part of the helical coil located therein substantially occupies an annular space between the rod and an inner wall of the channel.

7 Claims, 15 Drawing Sheets

(58) Field of Classification Search
USPC .................................. 137/540, 542, 535
See application file for complete search history.

(56) References Cited

U.S. PATENT DOCUMENTS

| | | | |
|---|---|---|---|
| 5,927,449 | A | 7/1999 | Huang et al. |
| 5,931,375 | A | 8/1999 | Gylov et al. |
| 6,772,958 | B1 | 8/2004 | Lamb et al. |
| 2008/0023078 | A1 | 1/2008 | Bahrton |
| 2008/0251749 | A1 | 10/2008 | Lah et al. |
| 2012/0048403 | A1 | 3/2012 | Chappel et al. |

FOREIGN PATENT DOCUMENTS

| | | |
|---|---|---|
| KR | 100269776 B1 | 10/2000 |
| TW | I298432 B | 7/2008 |
| TW | 200844336 A | 11/2008 |
| TW | M369483 U | 11/2009 |
| TW | 201226859 A | 7/2012 |
| TW | 201250139 A | 12/2012 |
| TW | 201300668 A | 1/2013 |

OTHER PUBLICATIONS

C.K.Singh et al., Stiffness Optimization of a Variable Restrictor-Compensated Hydrostatic Thrust Bearing System, Wear, 1977, pp. 223-230, vol. 44.

Narendra Singh et al., Performance of membrane compensated multirecess hydrostatic/hybrid flexible journal bearing system considering various recess shapes, Tribology International, 2004, pp. 11-24, vol. 37.

Yuan Kang et al., Modified predictions of restriction coefficient and flow resistance for membrane-type restrictors in hydrostatic bearing by using regression, Tribology International, 2007, pp. 1369-1380, vol. 40.

Xiaobo Zuo et al., Self-compensated Precision Hydrostatic Rotary Bearing, Advanced Materials Research, 2013, pp. 674,677, vol. 662.

W. Brian Rowe, Flow Control Mechanisms, Hydrostatic, Aerostatic and Hybrid Bearing Design, Mar. 2012, Ch. 5.5, pp. 90-99, ISBN:978-0-12-396994-1.

R. Bassani et al., Compensating Devices, Hydrostatic Lubrication, 1992, pp. 19-25, ISBN:978-0-444-88498-5.

* cited by examiner

FLOW REGULATOR

CROSS REFERENCE TO RELATED APPLICATION

This application claims the priority benefit of Taiwan Patent Application No. 103124749, filed on Jul. 18, 2014. The entirety of the above-mentioned patent application is incorporated herein by reference and made a part of this specification.

TECHNICAL FIELD

The present disclosure relates to a flow regulator. In particular, the present disclosure provides a flow regulator which is capable of regulating flow resistance of a fluid.

BACKGROUND

Conventionally, there are two types of flow regulators, which are common type flow regulator and compensating type flow regulator. In a common type flow regulator, a flow can be controlled and managed through the assembly of channels, capillary openings and/or grooves that are specifically designed and formed inside the flow regulator. On the other hand, a compensating type flow regulator is generally embedded with a pressure feedback regulating device for detecting and compensating the flow rate and pressure inside a fluid system in an automatic manner. It is noted that the pressure feedback regulating device is a flexible/movable mechanism that is generally composed of membranes, sliding shafts, and slide blocks.

However, although a common type flow regulator is simple in structure and is comparatively easy to be used for adjusting flow resistance, the structure for adjusting flow resistance requires precision machining, and this kind of flow regulator is not equipped with an automatic compensating function. On the other hand, although a compensating type flow regulator is equipped with the desired automatic compensating function, it is difficult to be used for adjusting flow resistance.

SUMMARY

A flow regulator is introduced herein.

In a first aspect, the present disclosure provides a flow regulator, which comprises: a channel, a rod, and a helical coil. The channel has a fluid inlet and a fluid outlet for a fluid flowing in and out of the flow regulator, respectively. The rod has a fore end and a rear end opposite to each other. The fore end is inside the channel, and the rear end is closer to the fluid outlet than the fluid inlet. The helical coil winds around the rod, and the helical pitch of the helical coil is adjustable for regulating flow resistance of the fluid. The channel further has a narrowed section where part of the helical coil located therein substantially occupies an annular space between the rod and an inner wall of the channel.

In a second aspect, the present disclosure provides a flow regulator, which comprises: a channel, a rod, a first helical coil, a slide block, and a force provider. The channel has a fluid inlet and a fluid outlet for a fluid flowing in and out of the flow regulator, respectively. The rod has a fore end and a rear end opposite to each other. The fore end is inside the channel, and the rear end is outside the channel. The first helical coil winds around the rod, and a helical pitch of the first helical coil is adjustable for regulating flow resistance of the fluid. The slide block is fit on the rod. The force provider provides a force to the slide block. The channel further has a narrowed section where part of the first helical coil substantially occupies an annular space between the rod and an inner wall of the channel, and the slide block is movable toward or away from the fluid outlet along the rod.

In a third aspect, the present disclosure provides a flow regulator, which comprises: a channel, a rod, a helical coil, and an adjusting element. The channel has a fluid inlet and a fluid outlet for a fluid flowing in and out of the flow regulator, respectively. The rod has a fore end and a rear end opposite to each other, and the fore end is inside the channel. The helical coil winds around the rod, and a helical pitch of the helical coil being adjustable for regulating flow resistance of the fluid. The adjusting element is fit on the channel and closer to the rear end of the rod than the fore end. The channel further has a narrowed section where part of the helical coil substantially occupies an annular space between the rod and an inner wall of the channel, and the helical pitch of the helical coil is adjustable by a movement of the adjusting element toward or away from the rear end of the rod.

Several exemplary embodiments will be described in details below accompanying with figures. The present disclosure will become more fully understood from the detailed description given herein below and the accompanying drawings which are given by way of illustration only, and thus are not limitative of the present disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the working principles of the disclosure.

DETAILED DESCRIPTION

Figure 1:
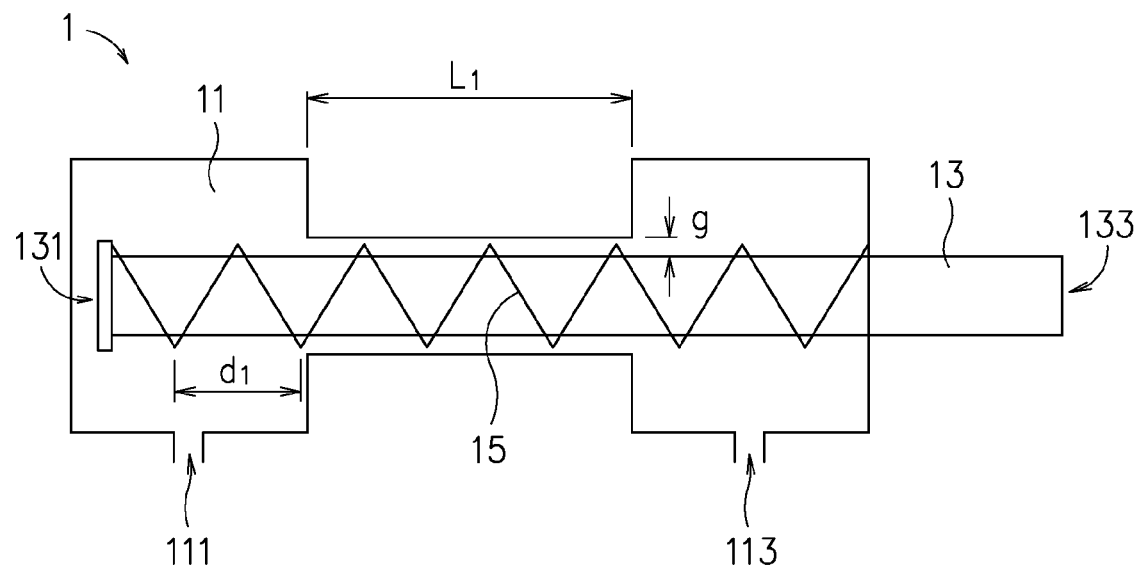
FIG. 1 is a schematic diagram showing a flow regulator, in accordance with a first exemplary embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Aspect

First of all, a first aspect of the present disclosure is described accompanying with FIG. 1 to FIG. 4B. In the first aspect, the present disclosure provides a flow regulator capable of regulating flow resistance of a fluid by adjusting helical pitch of the flow regulator.

FIG. 1 is a schematic diagram showing a flow regulator 1, in accordance with a first exemplary embodiment of the present disclosure. In FIG. 1, a flow regulator 1 comprises a channel 11, a rod 13, and a helical coil 15. The channel 11 has a fluid inlet 111 and a fluid outlet 113 for a fluid flowing in and out of the flow regulator 1, respectively. The rod 13 has a fore end 131 and a rear end 133 opposite to each other. The rod 13 is inserted into the channel 11 such that the fore end 131 is inside the channel 11. As FIG. 1 shown, the rear end 133 is closer to the fluid outlet 113 than the fluid inlet 111. The helical coil 15 winds around the rod 13, and a helical pitch $d_1$ of the helical coil 15 is adjustable for regulating flow resistance of the fluid.

Further, the channel 11 has a narrowed section, which falls in the area denoted by an effective regulating length $L_1$ in FIG. 1, where part of the helical coil 15 located therein substantially occupies an annular space between the rod 13 and inner wall of the channel 11. Since in the narrowed section (the area corresponding to $L_1$), there is not enough space between the rod 13 and the inner wall of the channel 11 for the fluid passing through, the fluid has to flow through the spacing in the helical coil 15 (defined by the helical pitch $d_1$), and the flow resistance of the fluid is thus affected by the dimension of the helical pitch $d_1$.

Furthermore, according to the first exemplary embodiment shown in FIG. 1, one end of the helical coil 15 is connected to the fore end 131 of the rod 13, and the other end of the helical coil 15 is connected to the inner wall of the channel 11 close to the fluid outlet 113. The rod 13 may have external threads (not shown) on it such that it may revolve with these threads and move along the axial direction of the channel 11 (parallel to a straight line from the fore end 131 to the rear end 133 of the rod 13). Therefore, the helical pitch $d_1$ of the helical coil 15 may be adjusted by moving the rod 13 more into or more out of the channel 11.

Figure 2:
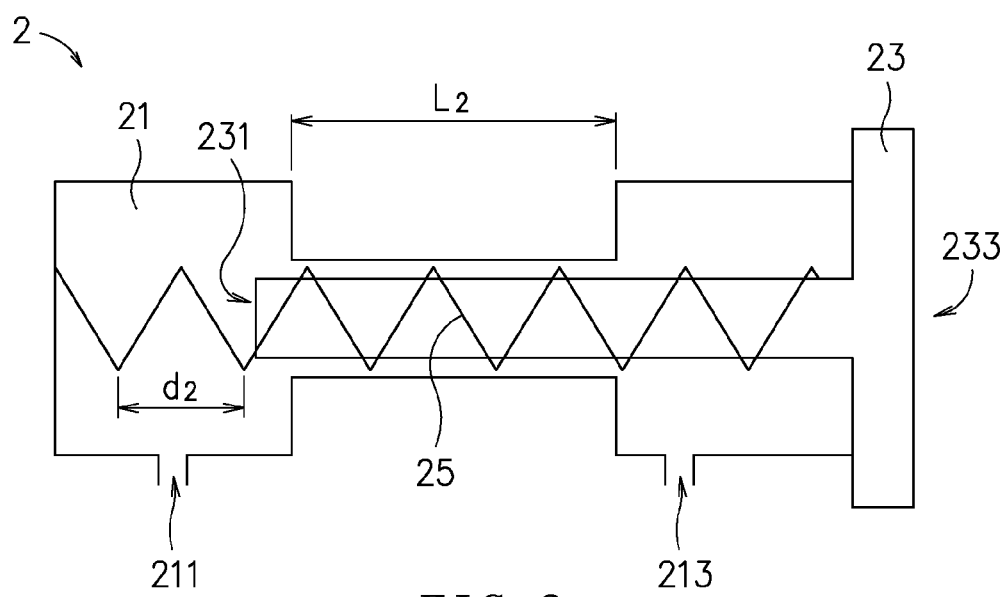
FIG. 2 is a schematic diagram showing a flow regulator, in accordance with a second exemplary embodiment of the present disclosure.

FIG. 2 is a schematic diagram showing a flow regulator 2, in accordance with a second exemplary embodiment of the present disclosure. In FIG. 2, a flow regulator 2 comprises a channel 21, a rod 23, and a helical coil 25. The channel 21 has a fluid inlet 211 and a fluid outlet 213 for a fluid flowing in and out of the flow regulator 2, respectively. The rod 23 has a fore end 231 and a rear end 233 opposite to each other. The rod 23 is inserted into the channel 21 such that the fore end 231 is inside the channel 21. As FIG. 2 shown, the rear end 233 is closer to the fluid outlet 213 than the fluid inlet 211. The helical coil 25 winds around the rod 23, and a helical pitch $d_2$ of the helical coil 25 is adjustable for regulating flow resistance of the fluid.

Further, the channel 21 has a narrowed section, which falls in the area denoted by an effective regulating length $L_2$ in FIG. 2, where part of the helical coil 25 substantially occupies an annular space between the rod 23 and inner wall of the channel 21. Since in the narrowed section (the area corresponding to $L_2$), there is not enough space between the rod 23 and the inner wall of the channel 21 for the fluid passing through, the fluid has to flow through the spacing in the helical coil 25 (defined by the helical pitch $d_2$), and the flow resistance of the fluid is thus affected by the dimension of the helical pitch $d_2$.

Furthermore, according to the second exemplary embodiment shown in FIG. 2, one end of the helical coil 25 is connected to the inner wall of the channel 21 close to the fluid inlet 211, and the other end of the helical coil 25 is connected to the rear end 233 of the rod 23. The rod 23 may have internal threads (not shown) on the rear end 233 such that it may revolve with these threads and move along the axial direction of the channel 21 (parallel to a straight line from the fore end 231 to the rear end 233 of the rod 23). Therefore, the helical pitch $d_2$ of the helical coil 25 may be adjusted by moving the rod 23 more into or more out of the channel 21.

The present disclosure provides a flow regulator which is capable of regulating flow resistance of a fluid, and the flow resistance may be adjusted by the change of the helical pitch of the helical coil. In the following, the working principle of the flow regulator will be explained along with FIG. 1.

Please be noted that the working principle of the flow regulator can be apply to all the exemplary embodiments of the present disclosure.

Please refer back to FIG. 1. A fluid may flow in and out of the channel 1 of the flow regulator 1 through the fluid inlet 111 and the fluid outlet 113. In the flow regulator 1, flow rate Q of the fluid can be calculated by the following simplified formula:

$$Q = \frac{\pi \left(\frac{2gd}{g+d}\right)^4 (P_{in} - P_{out})}{128 \, \mu L} \quad (1)$$

wherein

Q is the flow rate;

d is the helical pitch of the helical coil 15, as $d_1$ shown in FIG. 1;

$\mu$ is the dynamic viscosity of the fluid;

L is the effective regulating length of the helical coil 15 along the rod 13, as $L_1$ shown in FIG. 1, which corresponds to the narrowed section of the channel 11;

g is the gap between the rod 13 and the inner wall of the channel 11 in the narrowed section;

$P_{in}$ is an inlet pressure measured at the fluid inlet 111; and $P_{out}$ is an outlet pressure measured at the fluid outlet 113.

Here, please be noted that g is a fixed value in compliance with the designed dimension of the channel 11 and the rod 13.

From the above formula (1), it is clear that the flow rate Q is highly related to the helical pitch d and the effective regulating length L. To be more specific, the smaller the helical pitch d (which indicates that the helical coil 15 is compressed tighter) and/or the longer the effective regulating length L is, the smaller the flow rate Q will be. On the contrary, the larger the helical pitch d (which indicates that the helical coil 15 is released looser) and/or the shorter the effective regulating length L is, the bigger the flow rate Q will be. Besides, the helical pitch d has a higher impact over the effective regulating length L on the flow rate Q.

Further, the relation between the flow rate Q and the flow resistance R can be defined by the following formula:

$$Q = \frac{(P_{in} - P_{out})}{R} \quad (2)$$

The formula (2) shows that the flow rate Q and the flow resistance R are in inverse proportion while the flow rate Q and the pressure difference ($P_{in}-P_{out}$) are in direct proportion. In addition, when the fluid source provides constant fluid (the value of the inlet pressure $P_{in}$ is constant) the relation between the flow rate Q of the fluid leaving the flow regulator 1 and the outlet pressure $P_{out}$ can be expressed as follows: the bigger the flow resistance R is, the smaller the flow rate Q and the outlet pressure $P_{out}$ will be; and vice versa.

From the above two formulas (1) and (2), it will be readily understood to a person having ordinary skills in the art that one can adjust the helical pitch $d_1$ of the flow regulator 1 to have a required flow resistance R. To be more specific, if the helical pitch $d_1$ of the flow regulator 1 is set larger, the flow rate Q of the fluid leaving the channel 11 through the fluid outlet 113 and the outlet pressure $P_{out}$ will become bigger, and thus the flow resistance will R be smaller. On the contrary, if a bigger flow resistance R is required, the helical pitch $d_1$ of the flow regulator 1 needs to be set smaller, and the flow rate Q of the fluid leaving the channel 11 through the fluid outlet 113 and the outlet pressure $P_{out}$ will thus become smaller.

Figure 3A:
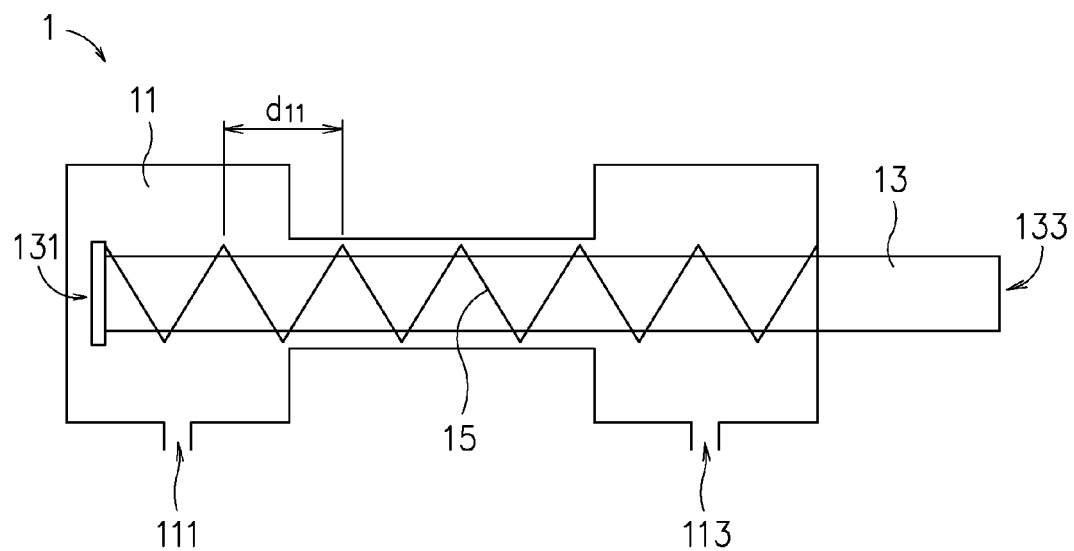
FIGS. 3A and 3B are schematic diagrams showing how to adjust a helical pitch of a helical coil of the flow regulator, in accordance with the first exemplary embodiment of the present disclosure.
Figure 3B:
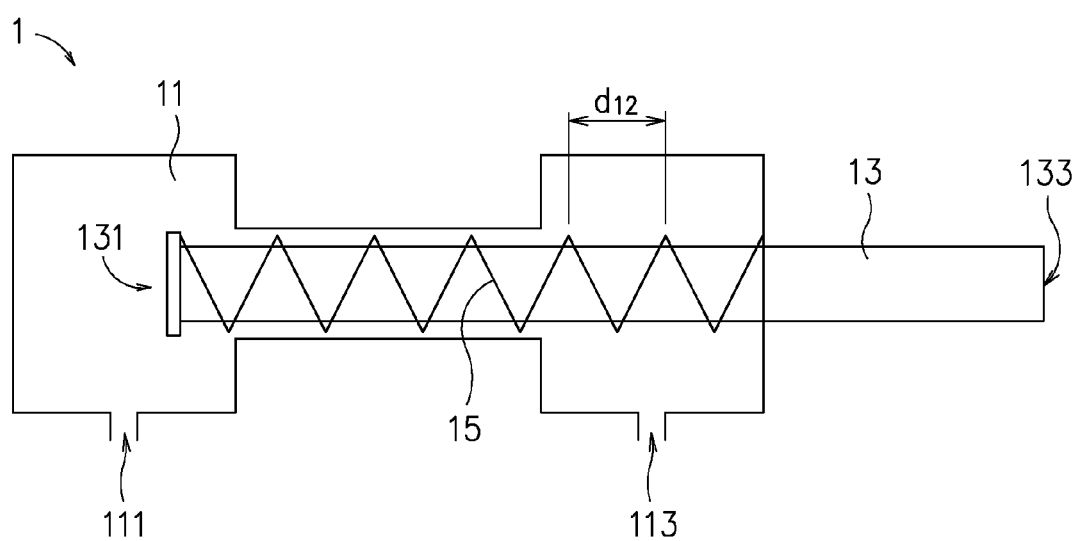

Next, please refer to FIGS. 3A and 3B. The operation of adjusting the helical pitch $d_1$ of the flow regulator 1 is described below with these figures.

FIGS. 3A and 3B are schematic diagrams showing how to adjust the helical pitch $d_1$ of the flow regulator 1 by moving the rod 13, in accordance with the first exemplary embodiment. Since one end of the helical coil 15 is connected to the fore end 131 of the rod 13, and the other end of the helical coil 15 is connected to the inner wall of the channel 11 close to the fluid outlet 113, the helical pitch $d_1$ of the flow regulator 1 may be altered by the movement of the rod 13 along the axial direction of the channel 11. In FIGS. 3A and 3B, the helical pitch $d_1$ of the helical coil 15 in the flow regulator 1 is respectively defined as $d_{11}$ and $d_{12}$. Compared with the condition shown in FIG. 3B, the rod 13 with the helical coil 15 in FIG. 3A is inserted more into the channel 11 (in other words, the rear end 133 of the rod 13 in FIG. 3A is closer to the fluid outlet 113 of the channel 11.) Therefore, the helical pitch $d_{11}$ in FIG. 3A would be larger than the helical pitch $d_{12}$ in FIG. 3B. Further, the flow resistance R in FIG. 3A would be smaller than that in FIG. 3B, according to the working principle set out before. From the above-mentioned, it can be readily understood that one may adjust the flow resistance R of the flow regulator 1 by simply moving the rod 13 more into or more out of the channel 11.

Figure 4A:
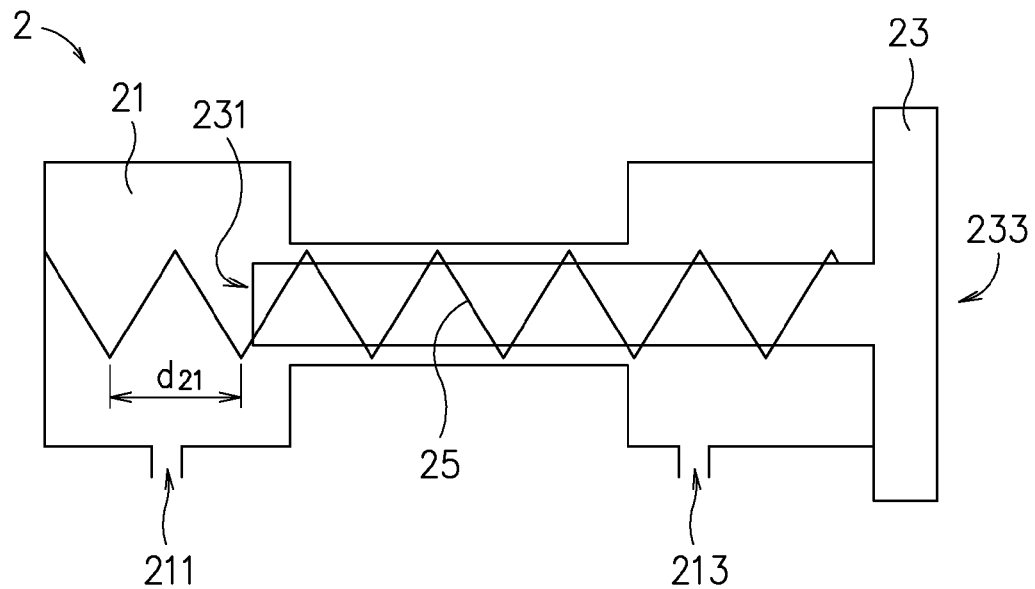
FIG. 4A and FIG. 4B are schematic diagrams showing how to adjust a helical pitch of a helical coil of the flow regulator, in accordance with the second exemplary embodiment of the present disclosure.
Figure 4B:
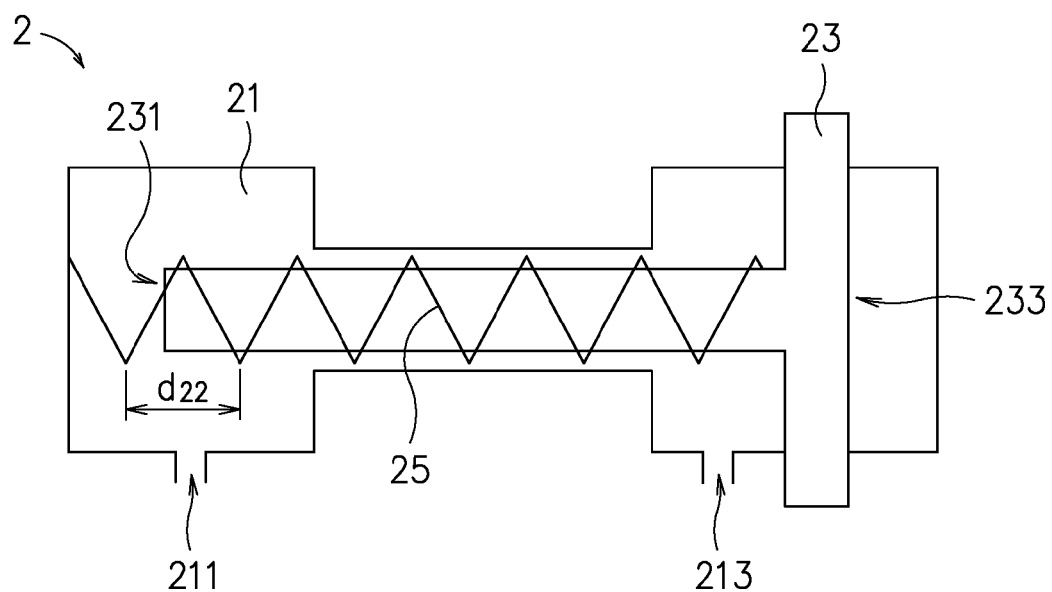

Now, please refer to FIGS. 4A and 4B. The operation of adjusting the helical pitch $d_2$ of the flow regulator 2 is described below with these figures. It should be noted that the working principle of the flow regulator 1 also apply to the flow regulator 2.

FIGS. 4A and 4B are schematic diagrams showing how to adjust the helical pitch $d_2$ of the flow regulator 2 by moving the rod 23, in accordance with the second exemplary embodiment. Since one end of the helical coil 25 is connected to the inner wall of the channel 21 close to the fluid inlet 211, and the other end of the helical coil 25 is connected to the rear end 231 of the rod 23, the helical pitch $d_2$ of the flow regulator 2 may be altered by the movement of the rod 23 along the axial direction of the channel 21. In FIGS. 4A and 4B, the helical pitch $d_2$ of the helical coil 25 in the flow regulator 2 is respectively defined as $d_{21}$ and $d_{22}$. Compared with the condition shown in FIG. 4A, the rod 23 with the helical coil 25 in FIG. 4B is inserted more into the channel 21 (in other words, the rear end 233 of the rod 23 in FIG. 4B is closer to the fluid outlet 213 of the channel 21). Therefore, the helical pitch $d_{21}$ in FIG. 4A would be larger than the helical pitch $d_{22}$ in FIG. 4B, and the flow resistance R in FIG. 4A would be smaller than that in FIG. 4B, according to the working principle set out before. From the above-mentioned, it can be readily understood that one may adjust the flow resistance R of the flow regulator 2 by simply moving the rod 23 more into or more out of the channel 21.

Second Aspect

Secondly, a second aspect of the present disclosure is described accompanying with FIG. 5 to FIG. 8C. In the second aspect, the present disclosure provides a flow regulator not only capable of regulating flow resistance of a fluid but also equipped with an automatic compensation function, and the automatic compensation function is achieved mainly by a movement of a slide block of the flow regulator.

Figure 5:
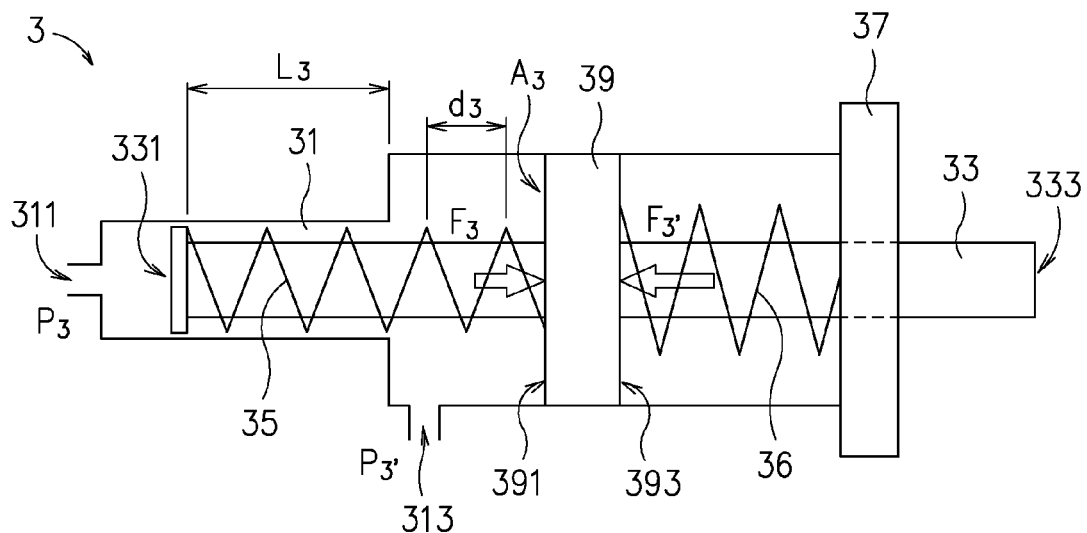
FIG. 5 is a schematic diagram showing a flow regulator, in accordance with the third exemplary embodiment of the present disclosure.

FIG. 5 is a schematic diagram showing a flow regulator 3, in accordance with a third exemplary embodiment of the present disclosure. In FIG. 5, a flow regulator 3 comprises a channel 31, a rod 33, a first helical coil 35, a second helical coil 36, an adjusting element 37, and a slide block 39. The channel 31 has a fluid inlet 311 and a fluid outlet 313 for a fluid flowing in and out of the flow regulator 3, respectively. The rod 33 has a fore end 331 and a rear end 333 opposite to each other. The rod 33 is inserted into the channel 31 such that the fore end 331 is inside the channel 31 and the rear end 333 is outside the channel 31, and the rod 33 is movable along an axial direction of the channel 31 (parallel to a straight line from the fore end 331 to the rear end 333 of the rod 33). The first helical coil 35 winds around the rod 33, and a helical pitch $d_3$ of the first helical coil 35 is adjustable for regulating flow resistance of the fluid. The second helical coil 36 and the adjusting element 37, which are used together as a force provider, provide a force to the slide block 39. The adjusting element 37 is fit on the rod 33 and may move toward or away from the rear end 333 of the rod 33. The second helical coil 36 winds around the rod 33. The slide block 39 is fit on the rod 33. To be specific, the rod 33 penetrates through the slide block 39, and the slide block 39 is connected with the rod 33 in a way such that the movement of rod 33 will not lead the slide block 39 to move together.

Further, the channel 31 has a narrowed section, which falls in the area denoted by an effective regulating length $L_3$ in FIG. 5, where part of the first helical coil 35 located therein substantially occupies an annular space between the rod 33 and inner wall of the channel 31. Since in the narrowed section (the area corresponding to $L_3$), there is not enough space between the rod 33 and the inner wall of the channel 31 for the fluid passing through, the fluid has to flow through the spacing in the first helical coil 35 (defined by the helical pitch $d_3$), and the flow resistance of the fluid is thus affected by the dimension of the helical pitch $d_3$.

Besides, the slide block 39 may move toward or away from the fluid outlet 313 along the rod 33. There may be a seal (not shown), such as an O-ring, mounted on the slide block 39 for coupling the slide block 39 to the channel 31, or the slide block 39 itself is such designed that it is coupled to the channel 31 tightly enough. Either way, the fluid will not flow into a space between the slide block 39 and the adjusting element 37 in the channel 31. In this embodiment, the fluid flows into the channel 31 through the fluid inlet 311, passes through the spacing in the first helical coil 35 in the narrowed section (the area corresponding to $L_3$), and then flows out of the channel 31 through the fluid outlet 313 without leaking into the space between the slide block 39 and the adjusting element 37 in the channel 31.

Furthermore, according to the third exemplary embodiment shown in FIG. 5, the slide block 39 comprises a regulating side 391 and a compensating side 393 opposite to each other. One end of the first helical coil 35 is connected to the fore end 331 of the rod 33, and the other end of the first helical coil 35 is connected to the regulating side 391 of the slide block 39. In addition, one end of the second helical coil 36 is connected to the compensating side 393 of the slide block 39, and the other end of the second helical coil 36 is connected to the adjusting element 37. The automatic compensation function is achieved by the dynamic relations among the first helical coil 35, the second helical coil 36, and the movable slide block 39. The working principle of how to achieve the automatic compensation function will be explained in detail later.

Figure 6:
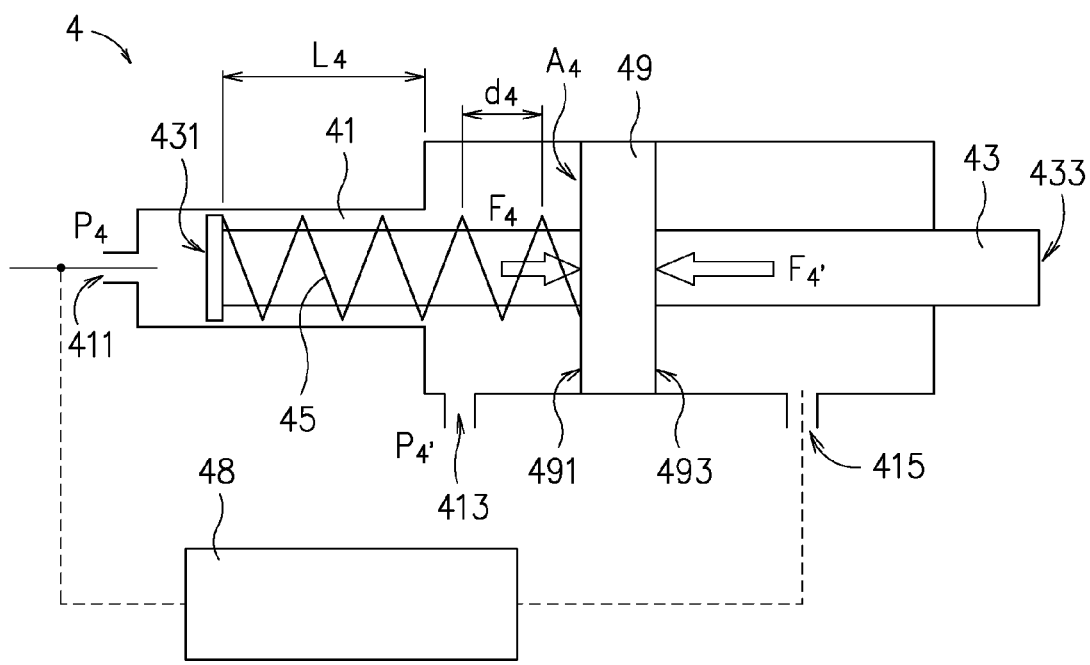
FIG. 6 is a schematic diagram showing a flow regulator, in accordance with the fourth exemplary embodiment of the present disclosure.

FIG. 6 is a schematic diagram showing a flow regulator 4, in accordance with a fourth exemplary embodiment of the present disclosure. In FIG. 6, a flow regulator 4 comprises a channel 41, a rod 43, a first helical coil 45, a controllable pressure regulator 48, and a slide block 49. The channel 41 has a fluid inlet 411 and a fluid outlet 413 for a fluid flowing in and out of the flow regulator 4, respectively. The rod 43 has a fore end 431 and a rear end 433 opposite to each other. The rod 43 is inserted into the channel 41 such that the fore end 431 is inside the channel 41 and the rear end 433 is outside the channel 41, and the rod 43 is movable along an axial direction of the channel 41 (parallel to a straight line from the fore end 431 to the rear end 433 of the rod 43). The first helical coil 45 winds around the rod 43, and a helical pitch $d_4$ of the first helical coil 45 is adjustable for regulating flow resistance of the fluid. The controllable pressure regulator 48, which is used as a force provider, provides a force to the slide block 49, and is in fluid communication with the channel 41 through an opening 415 of the channel 41. The slide block 49 is fit on the rod 43. To be specific, the rod 43 penetrates through the slide block 49, and the slide block 49 is connected with the rod 43 in a way such that the movement of rod 43 will not lead the slide block 49 to move together.

Further, the channel 41 has a narrowed section, which falls in the area denoted by an effective regulating length $L_4$ in FIG. 6, where part of the first helical coil 45 located therein substantially occupies an annular space between the rod 43 and inner wall of the channel 41. Since in the narrowed section (the area corresponding to $L_4$), there is not enough space between the rod 43 and the inner wall of the channel 41 for the fluid passing through, the fluid has to flow through the spacing in the helical coil 45 (defined by the helical pitch $d_4$), and the flow resistance of the fluid is thus affected by the dimension of the helical pitch $d_4$.

Besides, the slide block 49 may move toward or away from the fluid outlet 413 along the rod 43. To be specific, the slide block 49 may move between the fluid outlet 413 and the opening 415 of the channel 41. There may be a seal (not shown), such as an O-ring, mounted on the slide block 49 for coupling the slide block 49 to the channel 41, or the slide block 49 itself is such designed that it is coupled to the channel 41 tightly enough. Either way, the fluid will only flows in a space between the fluid inlet 411 and the slide block 49 in the channel 41. In this embodiment, the fluid flows into the channel 41 through the fluid inlet 411, passes through the spacing in the first helical coil 45 in the narrowed section (the area corresponding to $L_4$), and then flows out of the channel 41 through the fluid outlet 413; in other words, the fluid only flows in the space between the fluid inlet 411 and the slide block 49 in the channel 41.

Furthermore, according to the fourth exemplary embodiment shown in FIG. 6, the slide block 49 comprises a regulating side 491 and a compensating side 493 opposite to each other. One end of the first helical coil 45 is connected to the fore end 431 of the rod 43, and the other end of the first helical coil 45 is connected to the regulating side 491 of the slide block 49. In addition, the opening 415 of the channel 41 is closer to the compensating side 493 than the regulating side 491 of the slide block 49. The automatic compensation function is achieved by the dynamic relations among the first helical coil 45, the controllable pressure regulator 48, and the movable slide block 49. The working principle of how to achieve the automatic compensation function will be explained in detail later.

Moreover, in FIG. 6, the dash line denotes the flow communication associated with the controllable pressure regulator 48, and the same fluid source (not shown) provides fluid to the channel 41 through the fluid inlet 411 and to the controllable pressure regulator 48. However, in another example, the controllable regulator 48 may has a separate fluid source, and thus the dash line (denoting the fluid communication) will not appears to link the controllable pressure regulator 48 and the fluid inlet 411. Besides, the controllable pressure regulator 48 may be chose from any type of controllable pressure regulators known in the art.

The present disclosure provides a flow regulator not only capable of regulating flow resistance of a fluid but also equipped with an automatic compensation function. In the second aspect, the automatic compensation function is achieved mainly by the movement of the slide block. In the following, the working principle of how to achieve the automatic compensation function will be explained along with FIG. 5 and FIG. 6, respectively.

Please refer back to FIG. 5. When the flow regulator 3 is in equilibrium, forces applied to both the regulating side 391 and the compensating side 393 of the slide block 39 will be balanced, and can be expressed as the following formula:

$$F_3 + P_{3'} \times A_3 = F_{3'} \quad (3)$$

wherein $F_3$ is a first force provided by the first helical coil 35;

$F_{3'}$ is a second force provided by the second helical coil 36;

$P_{3'}$ is an outlet pressure measured at the fluid outlet 313; and $A_3$ is an effective area on which the outlet pressure $P_{3'}$ is applied.

Both $F_3$ and $(P_{3'} \times A_3)$ are applied to the regulating side 391 of the slide block 39, and $F_{3'}$ is applied to the compensating side 393 of the slide block 39.

The first force $F_3$ from the first helical coil 35 and the second force $F_{3'}$ from the second helical coil 36 may be adjusted simply by respectively changing the helical pitches of the first helical coil 35 and the second helical coil 36. Further, since the slide block 39 is connected to the first helical coil 35 at the regulating side 391 and connected to the second helical coil 36 at the compensating side 393, the change of the helical pitch $d_3$ of the first helical coil 35 would result in moving the slide block 39 toward or away from the fluid outlet 313 and thus changing the helical pitch of the second helical coil 36; and vice versa.

In addition, from to the above formula (3), it is clearly that the outlet pressure $P_{3'}$ is affected by the first force $F_3$ from the first helical coil 35 and the second force $F_{3'}$ from the second helical coil 36. Therefore, the outlet pressure $P_{3'}$ at the fluid outlet 313, where the fluid flows out of the channel 31, may be altered by changing the helical pitches of the first helical coil 35 or the second helical coil 36. On the other hand, when a pressure of a subsequent chamber (not shown) connected to the channel 31 through the fluid outlet 313 is changed and thus affecting the outlet pressure $P_{3'}$ at the fluid outlet 313, through the dynamic relations among the first helical coil 35, the second helical coil 36, and the movable slide block 39, the flow resistance R is varied because of the alteration of the helical pitch $d_3$ of the first helical coil 35, and the effect causing by the pressure change in the subsequent chamber is automatic compensated consequently.

Now, please refer to FIG. 6. Similar to the above description for the flow regulator 3, when the flow regular 4 is in equilibrium, forces applied to both the regulating side 491 and the compensating side 493 of the slide block 49 will be balanced, and can be expressed as the following formula:

$$F_4 + P_{4'} \times A_4 = F_{4'} \quad (4)$$

wherein $F_4$ is a first force provided by the first helical coil 45;

$F_{4'}$ is a second force provided by the controllable pressure regulator 48;

$P_{4'}$ is an outlet pressure measured at the fluid outlet 413; and $A_4$ is an effective area on which the outlet pressure $P_{4'}$ is applied.

Here, please be noted that, different from the flow regulator 3, according to the fourth embodiment, $F_{4'}$ is provided by the controllable pressure regulator 48, instead of another helical coil. Both $F_4$ and $(P_{4'} \times A_4)$ are applied to the regulating side 491 of the slide block 49, and $F_{4'}$ is applied to the compensating side 493 of the slide block 49.

The first force $F_4$ from the first helical coil 45 may be adjusted simply by changing the helical pitch $d_4$ of the first helical coil 45, and the second force $F_{4'}$ may be altered by setting the controllable pressure regulator 48 to a required pressure. Further, since the slide block 49 is connected to the first helical coil 45 at the regulating side 491 and subject to the force $F_{4'}$ provided by the controllable pressure regulator 48 at the compensating side 493, the change of the helical pitch $d_4$ of the first helical coil 45 would definitely result in moving the slide block 49 toward or way from the fluid outlet 413; and vice versa.

In addition, from to the above formula (4), it is clearly that the outlet pressure $P_{4'}$ is affected by the first force $F_4$ from the first helical coil 45 and the second force $F_{4'}$ from the controllable pressure regulator 48. Therefore, when the controllable pressure regulator 48 is set to a certain pressure, the outlet pressure $P_{4'}$ at the fluid outlet 413, where the fluid flows out of the channel 41, may be altered by changing the helical pitch $d_4$ of the first helical coil 45. On the other hand, when a pressure of a subsequent chamber (not shown) connected to the channel 41 through the fluid outlet 413 is changed and thus affecting the outlet pressure $P_{4'}$ at the fluid outlet 413, through the dynamic relations among the first helical coil 45, the controllable pressure regulator 48, and the movable slide block 39, the flow resistance R is varied because of the alteration of the helical pitch $d_4$ of the first helical coil 45, and the effect causing by the pressure change in the subsequent chamber is automatic compensated consequently.

To be more specific, since the force $F_{4'}$ provided by the controllable pressure regulator 48 is a constant value after the setting, when the outlet pressure $P_{4'}$ becomes bigger, the slide block 49 will move away from the fluid outlet 413, and thus increasing the helical pitch $d_4$ of the first helical coil 45. The flow resistance R is therefore decreased. On the other hand, when the outlet pressure $P_{4'}$ becomes smaller, the slide block 49 will move toward the fluid outlet 413, and thus decreasing the helical pitch $d_4$ of the first helical coil 45. The flow resistance R is therefore increased.

Figure 7A:
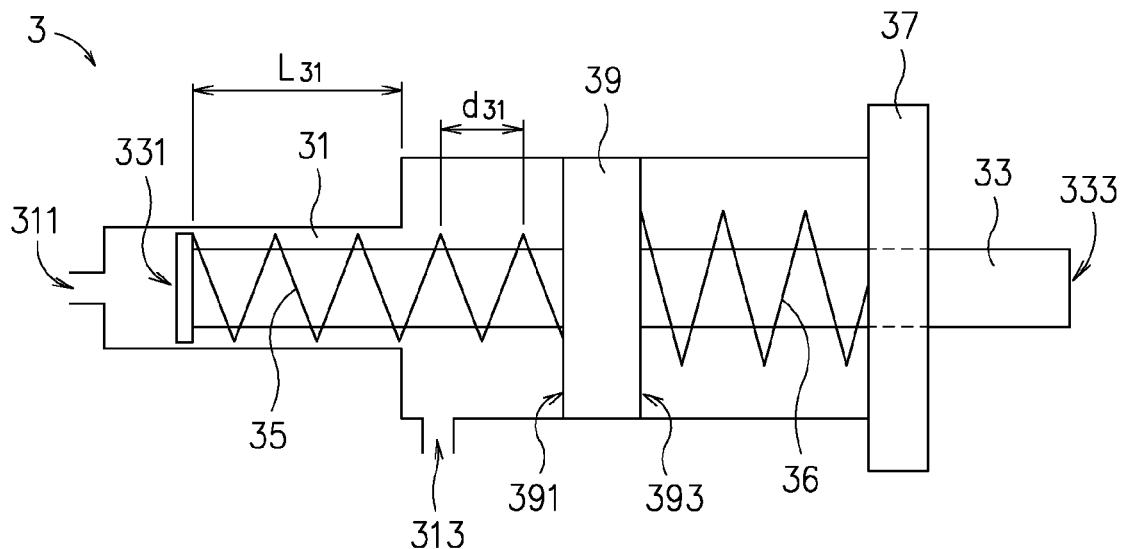
FIG. 7A-7C are a series of schematic diagrams showing how to adjust a helical pitch of a first helical coil of the flow regulator, in accordance with the third exemplary embodiment of the present disclosure.
Figure 7B:
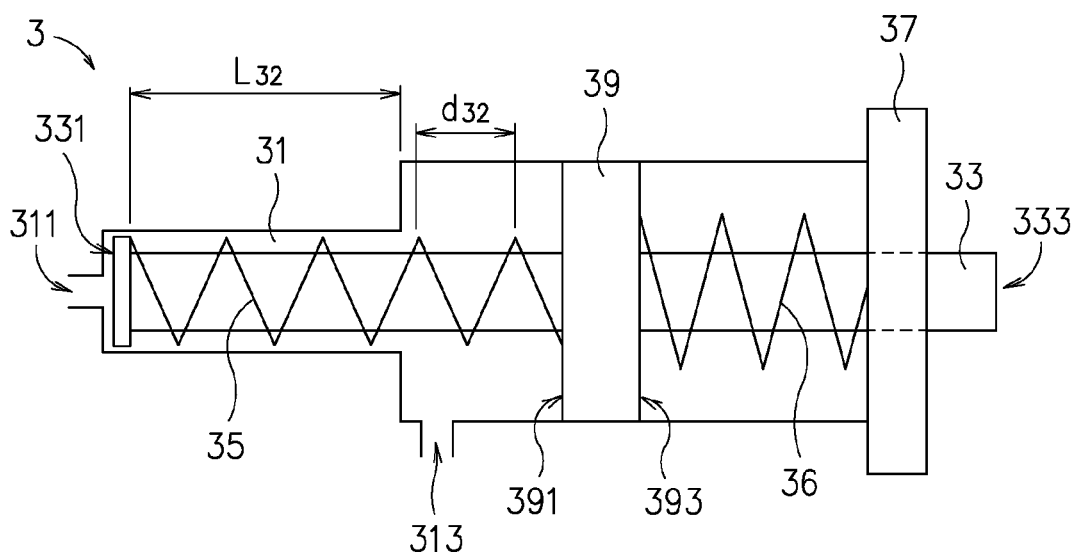
Figure 7C:
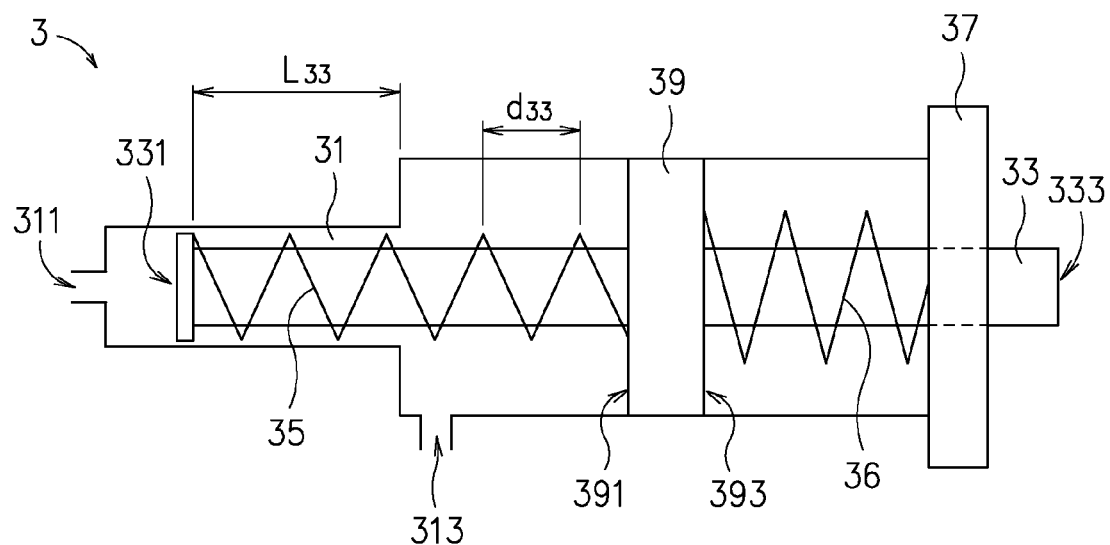

Next, please refer to FIG. 7A~7C. The operation of adjusting the helical pitch $d_3$ of the flow regulator 3 is described below with these figures. It should be noted that as the operation of adjusting the helical pitch $d_4$ of the flow regulator 4 is similar to that of the flow regulator 3, it will not be described further herein.

FIGS. 7A and 7B are schematic diagrams showing how to adjust the helical pitch $d_3$ of the flow regulator 3 by moving the rod 33, in accordance with the third exemplary embodiment. Since one end of the helical coil 35 is connected to the fore-end 331 of the rod 33, and the other end of the helical coil 35 is connected to the slide block 39, the helical pitch $d_3$ of the flow regulator 3 may be altered by the movement of the rod 33 along the axial direction of the channel 31.

In FIGS. 7A and 7B, the helical pitch $d_3$ of the first helical coil 35 is respectively defined as $d_{31}$ and $d_{32}$, and the effective regulating length $L_3$ thereof is respectively defined as $L_{31}$ and $L_{32}$. Compared with the condition shown in FIG. 7A, the rod 33 with the first helical coil 35 in FIG. 7B is inserted more into the channel 31 (in other words, the fore-end 331 of the rod 33 is closer to the fluid inlet 311). Therefore, the helical pitch $d_{32}$ and the effective regulating length $L_{32}$ in FIG. 7B would be larger than the helical pitch $d_{31}$ and the effective regulating length $L_{31}$ in FIG. 7A. As the working principle set out before, the larger the helical pitch $d_3$ or the shorter the effective regulating length $L_3$ is, the smaller the flow resistance R will be, and the helical pitch $d_3$ has more effect on the flow resistance R than the effective regulating length $L_3$ does. Therefore, the flow resistance R in FIG. 7B is smaller than that in FIG. 7A. One the other hand, when a bigger flow resistance R in required, the rod 33 may be moved more out of the channel 31 (in other words, the fore-end 331 of the rod 33 is away from the fluid inlet 311) than the rod 33 in FIG. 7A does. In such circumstance, the helical pitch $d_3$ and the effective regulating length $L_3$ of the flow regulator 3 will be smaller, and the bigger flow resistance R is achieved as a result.

FIGS. 7A and 7C are schematic diagrams showing how to adjust the helical pitch $d_3$ of the flow regulator 3 by moving the adjusting element 37, in accordance with the third exemplary embodiment. If a required flow resistance R cannot be achieved by the movement of the rod 33, the adjusting element 37 may be further moved along the rod 33 to adjust the flow resistance R.

In FIGS. 7A and 7C, the helical pitch $d_3$ of the first helical coil 35 is respectively defined as $d_{31}$ and $d_{33}$, and the effective regulating length $L_3$ thereof is respectively defined as $L_{31}$ and $L_{33}$. Compared with the condition shown in FIG. 7A, the adjusting element 37 in FIG. 7C is moved more toward the rear end 333 of the rod 33. In such circumstance, due to the force difference between the first and second helical coil 35 and 36, the slide block 39 will move more away from the fluid outlet 313, and the helical pitch $d_{33}$ in FIG. 7C is thus be larger than the helical pitch $d_{31}$ of the first helical coil 35 in FIG. 7A. As the working principle set out before, the larger the helical pitch $d_3$ is, the smaller the flow resistance R will be. Therefore, the flow resistance R in FIG. 7C is smaller than in FIG. 7A.

From the above description with reference to FIG. 7A~7C, it is clear that the flow resistance R of the flow regulator 3 can be varied by moving the rod 33 more into or away from the channel 31. Further, in the condition when the required flow resistance R cannot be achieved by the movement of the rod 33, the flow resistance R can be altered by moving the adjusting element 37 more toward or away from the rear end 333 of the rod 33. Here, it should be noted that the operation for adjusting the flow resistance R of the flow regulator 3 also apply to the flow regulator 4, too.

Figure 8A:
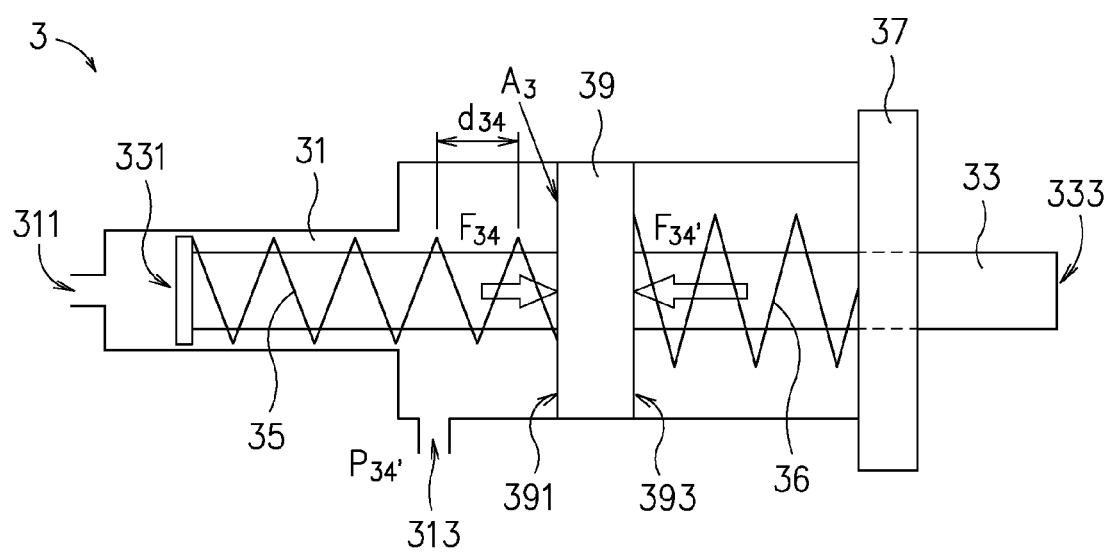
FIG. 8A-8C are a series of schematic diagrams showing how the helical pitch of the first helical coil of the flow regulator varies automatically along with the pressure change of an outlet pressure measured at a fluid outlet of a channel of the flow regulator, in accordance with the third exemplary embodiment of the present disclosure.
Figure 8B:
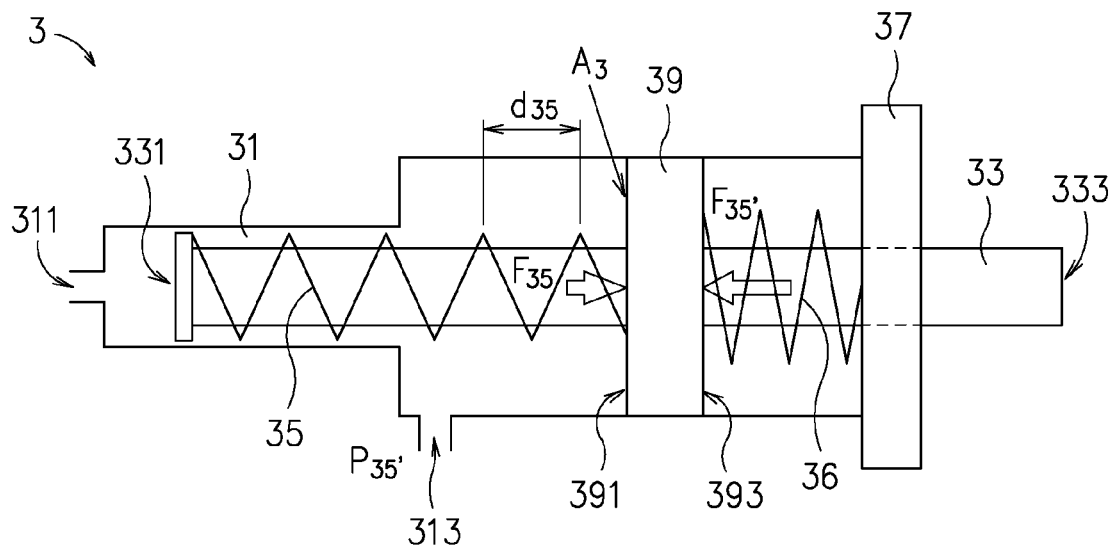
Figure 8C:
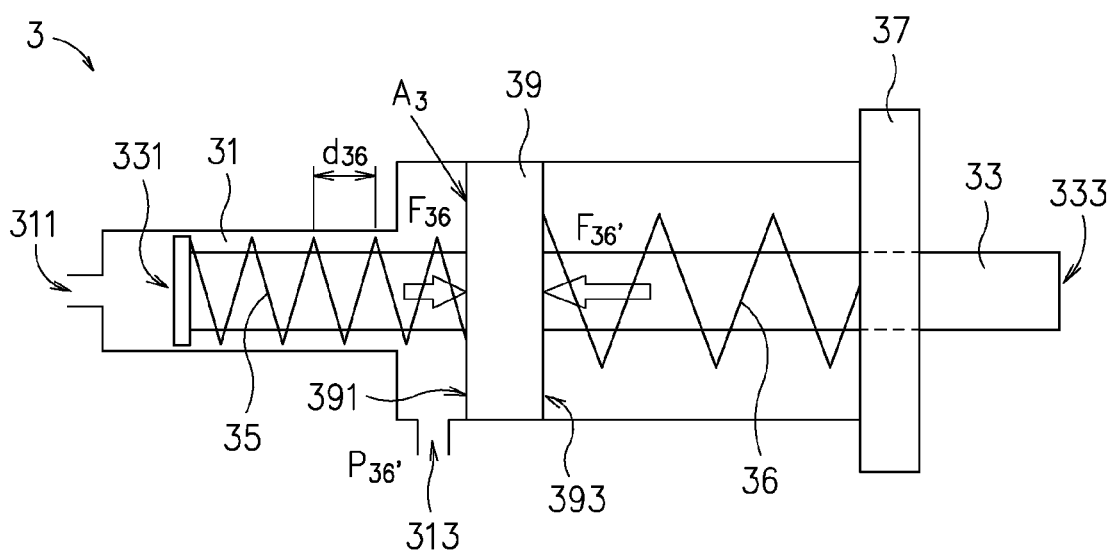

Next, please refer to FIG. 8A~8C. The operation demonstrating how the automatic compensation function of the flow regulator 3 works is described below with these figures. It should be noted that as the operation demonstrating how the automatic compensation function of the flow regulator 4 works is basically the same as the flow regulator 3, it will not be described further herein.

FIG. 8A~8C are a series of schematic diagrams showing how the helical pitch $d_3$ of the first helical coil 35 of the flow regulator 3 varies automatically along with the pressure change of the outlet pressure $P_{3'}$ measured at the fluid outlet 313 of the channel 31, in accordance with the third exemplary embodiment of the present disclosure. Since the operation of the flow regulator 3 follows previously mentioned formula (3): $(F_3+P_3 \times A_3 = F_{3'})$, and the movable slide block 39 is subject to $(F_3+P_3 \times A_3)$ at the regulating side 391 and $F_{3'}$ at the compensating side 393, the slide block 39 may move toward or away from the fluid outlet 313 as any of these forces changes.

In FIGS. 8A, 8B, and 8C, the helical pitch $d_3$ of the first helical coil 35 is respectively defined as $d_{34}$, $d_{35}$, and $d_{36}$, and the outlet pressure measured at the fluid outlet 313 of the channel 31 is respectively defined as $P_{34'}$, $P_{35'}$, and $P_{36'}$.

First, please refer to FIGS. 8A and 8B, which shows how the slide block 39 moves when the outlet pressure $P_{34'}$ changes to $P_{35'}$. To be more specific, when the pressure of the subsequent chamber (not shown) connected to the flow regulator 3 through the fluid outlet 313 is increased, the outlet pressure $P_{34'}$ in FIG. 8A will increase to $P_{35'}$ in FIG. 8B (i.e. $P_{35'} > P_{34'}$). Owing to the higher pressure $P_{35'}$ at the fluid outlet 313, the slide block 39 in FIG. 8B will be forced to move away from the fluid outlet 313, and the helical pitch $d_{34}$ of the first helical coil 35 thus becomes larger (i.e. $d_{35} > d_{34}$), compared with the condition in FIG. 8A. In such circumstance, the first force $F_3$ provided by the first helical coil 35 decreases (i.e. $F_{35} < F_{34}$), the second force $F_{3'}$ provided by the second helical coil 36 increases (i.e. $F_{35'} > F_{34'}$), and the final position of the rod 33 is determined by the force difference between the first and the second force $F_3$ and $F_{3'}$.

As the working principle set out before, the larger the helical pitch $d_3$ is, the smaller the flow resistance R will be. Therefore, the flow resistance R in FIG. 8B is smaller than in FIG. 8A. As the flow resistance R gets smaller, the flow rate Q and the overall pressure in the flow regulator 3 will becomes larger in an automatically compensating manner.

Next, please refer to FIGS. 8A and 8C, which shows how the slide block 39 moves when the outlet pressure $P_{34'}$ changes to $P_{36'}$. To be more specific, when the pressure of the subsequent chamber (not shown) connected to the flow regulator 3 through the fluid outlet 313 is decreased, the outlet pressure $P_{34'}$ in FIG. 8A will decrease to $P_{36'}$ in FIG. 8C (i.e. $P_{36'} < P_{34'}$). Owing to the lower pressure $P_{36'}$ at the fluid outlet 313, the slide block 39 in FIG. 8C will be forced to move toward the fluid outlet 313, the helical pitch $d_{36}$ of the first helical coil 35 thus becomes smaller (i.e. $d_{36} < d_{34}$), compared with the condition in FIG. 8A. In such circumstance, the first force $F_3$ provided by the first helical coil 35 increases (i.e. $F_{36} > F_{34}$), the second force $F_{3'}$ provided by the second helical coil 36 decreases (i.e. $F_{36'} < F_{34'}$), and the final position of the rod 33 is determined by the force difference between the first and the second force $F_3$ and $F_{3'}$.

As the working principle set out before, the smaller the helical pitch $d_3$ is, the bigger the flow resistance R will be. Therefore, the flow resistance R in FIG. 8C is bigger than in FIG. 8A. As the flow resistance R gets bigger, the flow rate Q and the overall pressure in the flow regulator 3 will becomes smaller in an automatically compensating manner.

From the above description with reference to FIG. 8A-8C, it is clear that the flow resistance R of the flow regulator 3 can be varied automatically along with the pressure change in the subsequent chamber (not shown) connected to the channel 31 through the fluid outlet 313 of the flow regulator 3, which in turn causes the flow rate Q and overall pressure of the flow regulator 3 to be changed in an automatically compensating manner. Here, it should be noted that the automatic compensation function works for the flow regulator 3 also apply to the flow regulator 4, too.

Third Aspect

Thirdly, a third aspect of the present disclosure is described accompanying with FIG. 9 to FIG. 17B. In the third aspect, the present disclosure provides a flow regulator not only capable of regulating flow resistance of a fluid but also equipped with an automatic compensation function, and the automatic compensation function is achieved mainly by a movement of a rod of the flow regulator.

Figure 9:
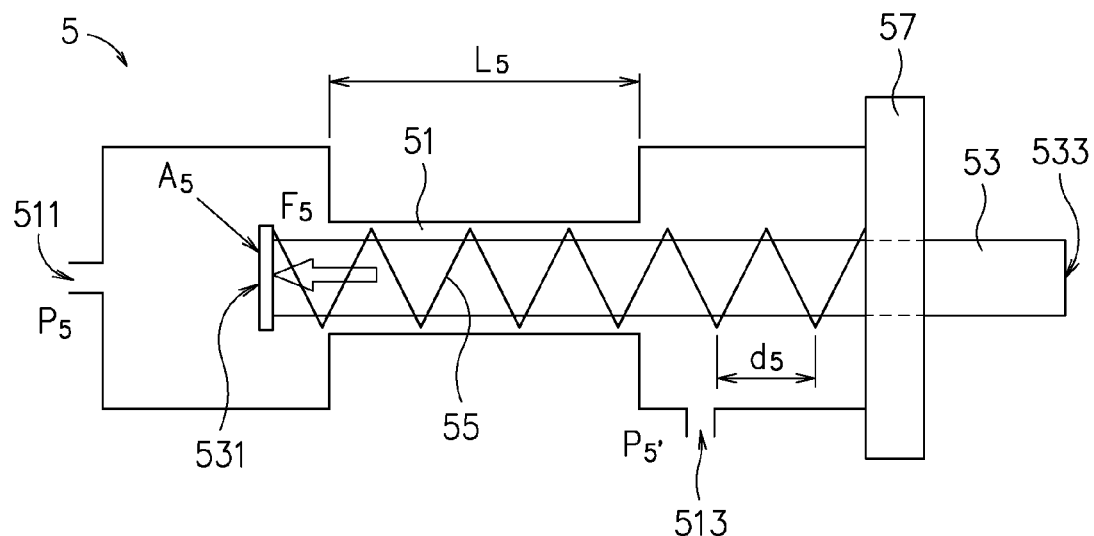
FIG. 9 is a schematic diagram showing a flow regulator, in accordance with the fifth exemplary embodiment of the present disclosure.

FIG. 9 is a schematic diagram showing a flow regulator 5 according to a fifth exemplary embodiment of the present disclosure. In FIG. 9, a flow regulator 5 comprises a channel 51, a rod 53, a helical coil 55, and an adjusting element 57. The channel 51 has a fluid inlet 511 and a fluid outlet 513 for a fluid flowing in and out of the flow regulator 5, respectively. The rod 53 has a fore end 531 and a rear end 533 opposite to each other. The rod 53 is inserted into the channel 51 such that at least the fore end 531 is inside the channel 51, and the rod 53 is movable along an axial direction of the channel 51 (parallel to a straight line from the fore end 531 to the rear end 533 of the rod 53). The helical coil 55 winds around the rod 53, and a helical pitch $d_5$ of the helical coil 55 is adjustable for regulating flow resistance of the fluid. The adjusting element 57 is fit on the channel 51, and closer to the rear end 533 than the fore end 531 of the rod 53.

Further, the channel 51 has a narrowed section, which falls in the area denoted by an effective regulating length $L_5$ in FIG. 9, where part of the helical coil 55 located therein substantially occupies an annular space between the rod 53 and inner wall of the channel 51. Since in the narrowed section (the area corresponding to $L_5$), there is not enough space between the rod 53 and the inner wall of the channel 51 for the fluid passing through, the fluid has to flow through the spacing in the helical coil 55 (defined by the helical pitch $d_5$), and the flow resistance of the fluid is thus affected by the dimension of the helical pitch $d_5$.

Furthermore, according to the fifth exemplary embodiment shown in FIG. 9, the adjusting element 57 is further fit on the rod 53. In one example, the adjusting element 57 may have internal threads (not shown) on it such that the adjusting element 57 may revolve with these threads and move along the axial direction of the channel 51. The adjusting element 57 may have different structure in other example as long as it may move along the axial direction of the channel 51. Moreover, one end of the helical coil 55 is connected to the fore end 531 of the rod 53, and the other end of the helical coil 55 is connected to the adjusting element 57. Therefore, the helical pitch $d_5$ of the helical coil 55 may be adjusted by moving the adjusting element 57 toward or away from the rear end 533.

The present disclosure provides a flow regulator which is not only capable of regulating flow resistance of a fluid but also equipped with an automatic compensation function. In the fifth exemplary embodiment, the automatic compensation function is achieved mainly by the movable rod 53 with the helical coil 55 winding on it. In the following, the working principle of how to achieve the automatic compensation function will be explained along with FIG. 9.

Please refer to FIG. 9 again. When the flow regulator 5 is in equilibrium, forces applied to the fore end 531 of the rod 53 is balanced, and can be expressed as the following formula:

$$P_5 \times A_5 = F_5 \quad (5)$$

wherein $F_5$ is a force provided by the helical coil 55;
$P_5$ is an inlet pressure measured at the fluid inlet 511; and
$A_5$ is an effective area on which the inlet pressure $P_5$ is applied.

Here, please be noted that the effective area $A_5$ may be regarded as the cross sectional area of the fore end 531 of the rod 53.

As the fore end 531 of the rod 53 is subject to the force $F_5$ and the inlet pressure $P_5$, altering the force $F_5$ by adjusting the helical pitch $d_5$ of the helical coil 55 may affect the magnitude of the pressure applied to the effective area $A_5$. On the other hand, the change of the inlet pressure $P_5$ would result in moving the rod 53 toward or away from the fluid inlet 513. Further, since one end of the helical coil 55 is connected to the fore end 531 of the rod 53, and the other end of the helical coil 55 is connected to the adjusting element 57, which is fixed to a certain position under a normal condition, the helical pitch $d_5$ of the helical coil 55 will be changed due to the movement of the rod 53, and thus the flow resistance R of the fluid is altered, as the working principle set out before. In brief, when the inlet pressure $P_5$ changes, through the movement of the rod 53, the flow resistance R is varied because of the alteration of the helical pitch $d_5$ of the helical coil 55, and the effect causing by the pressure change is automatic compensated consequently.

Figure 10:
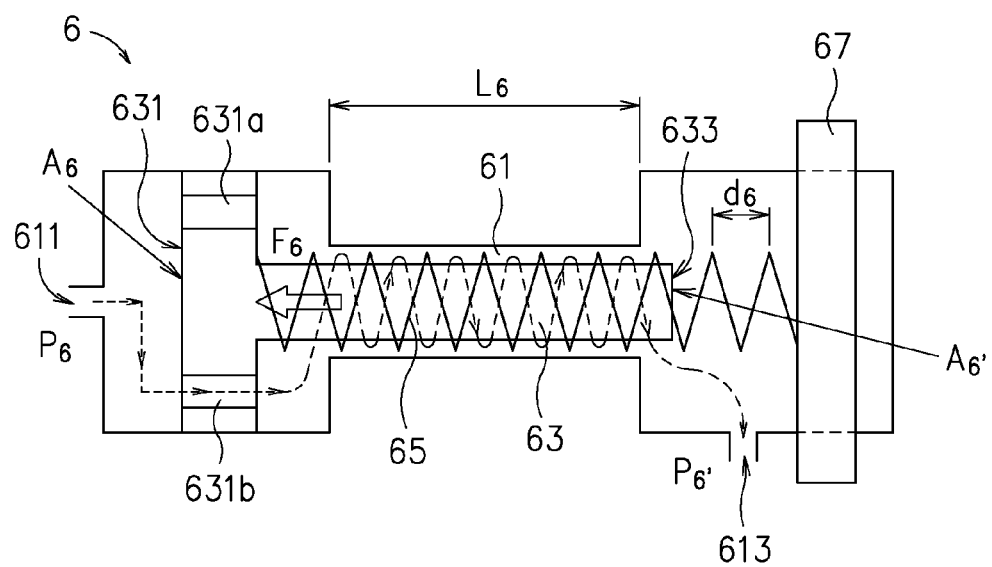
FIG. 10 is a schematic diagram showing a flow regulator, in accordance with the sixth exemplary embodiment of the present disclosure.

FIG. 10 is a schematic diagram showing a flow regulator 6 according to a sixth exemplary embodiment of the present disclosure. In FIG. 10, a flow regulator 6 comprises a channel 61, a rod 63, a helical coil 65, and an adjusting element 67. The channel 61 has a fluid inlet 611 and a fluid outlet 613 for a fluid flowing in and out of the flow regulator 6, respectively. The rod 63 has a fore end 631 and a rear end 633 opposite to each other. The rod 63 is inserted into the channel 61 such that the fore end 631 and the rear end 633 are both inside the channel 61, and the rod 63 is movable along an axial direction of the channel 61 (parallel to a straight line from the fore end 631 to the rear end 633 of the rod 63). The helical coil 65 winds around the rod 63, and a helical pitch $d_6$ of the helical coil 65 is adjustable for regulating flow resistance of the fluid. The adjusting element 67 is fit on the channel 61, and closer to the rear end 633 than the fore end 631 of the rod 63.

Further, the channel 61 has a narrowed section, which falls in the area denoted by an effective regulating length $L_6$ in FIG. 10, where part of the helical coil 65 located therein substantially occupies an annular space between the rod 63 and inner wall of the channel 61. Since in the narrowed section (the area corresponding to $L_6$), there is not enough space between the rod 63 and the inner wall of the channel 61 for the fluid passing through, the fluid has to flow through the spacing in the helical coil 65 (defined by the helical pitch $d_6$), and the flow resistance of the fluid is thus affected by the dimension of the helical pitch $d_6$.

Furthermore, according to the sixth exemplary embodiment shown in FIG. 10, the fore end 631 of the rod 63 has passages 631a and 631b for the fluid passing through, and an cross sectional area of the fore end 631 is larger than an cross sectional area of the rear end 633 such that the rod 63 may keep its position in the middle with respect to the radial direction of the channel 61 (perpendicular to the straight line from the fore end 631 to the rear end 633 of the rod 63). In one example, the fore end 631 of the rod 63 may contact the inner wall of the channel 61; however, in another example, there may be space between the fore end 631 of the rod 63 and the inner wall of the inner wall of the channel 61. In this embodiment, the fluid flows into the channel 61 through the fluid inlet 611, passes through the passages 631a and 631b, then in the narrowed section (the area corresponding to $L_6$), the fluid flows through the spacing in the helical coil 65, and finally, the fluid flows out of the channel 61 through the fluid outlet 613. In FIG. 10, the flow of the fluid is represented by a continuous dash line with arrow. In addition, one end of the helical coil 65 is connected to the fore end 631 of the rod 63, and the other end of the helical coil 65 is connected to the adjusting element 67. Therefore, the helical pitch $d_6$ of the helical coil 65 may be adjusted by moving the adjusting element 67 toward or away from the rear end 633 (and toward or away from the fluid outlet 613 in this embodiment, to be specific).

The present disclosure provides a flow regulator which is not only capable of regulating flow resistance of a fluid but also equipped with an automatic compensation function. In the sixth exemplary embodiment, the automatic compensation function is achieved mainly by the movable rod 63 with the helical coil 65 winding on it. In the following, the working principle of how to achieve the automatic compensation function will be explained along with FIG. 10.

Please refer to FIG. 10 again. When the flow regulator 6 is in equilibrium, forces applied to the rod 63 is balanced, and can be expressed as the following formula:

$$F_6 + P_6 \times A_6 = P_{6'} \times A_{6'} \quad (6)$$

wherein $F_6$ is a force provided by the helical coil 65;

$P_6$ is an inlet pressure measured at the fluid inlet 611;

$P_{6'}$ is an outlet pressure measured at the fluid outlet 613;

$A_6$ is an effective area on which the inlet pressure $P_6$ is applied; and $A_{6'}$ is an effective area on which the outlet pressure $P_{6'}$ is applied.

Here, please be noted that the effective area $A_6$ may be regarded as the cross sectional area of the fore end 631 of the rod 63 minus the cross sectional area of the passages 631a and 631b, and the effective area $A_{6'}$ may be regarded as the cross sectional area of the rear end 633 of the rod 63.

As the rod 63 is subject to the inlet pressure $P_6$ and the force $F_6$ at the fore end 631, and the outlet pressure $P_{6'}$ at the rear end 633, the change of the outlet pressure $P_{6'}$, which is affected by an pressure of a subsequent chamber (not shown) connected to the channel 61 through the fluid outlet 613, would result in moving the rod 63 toward or away from the fluid outlet 613. Further, since one end of the helical coil 65 is connected to the fore end 631 of the rod 63 and the other end is connected to the adjusting element 67, which is fixed to a certain position under a normal condition, the helical pitch $d_6$ of the helical coil 65 will be changed due to the movement of the rod 63, and thus the flow resistance R of the fluid is altered, as the working principle set out before. In brief, when the outlet pressure $P_{6'}$ changes, through the movement of the rod 63, the flow resistance R is varied because of the alteration of the helical pitch $d_6$ of the helical coil 65, and the effect causing by the pressure change is automatic compensated consequently.

Figure 11:
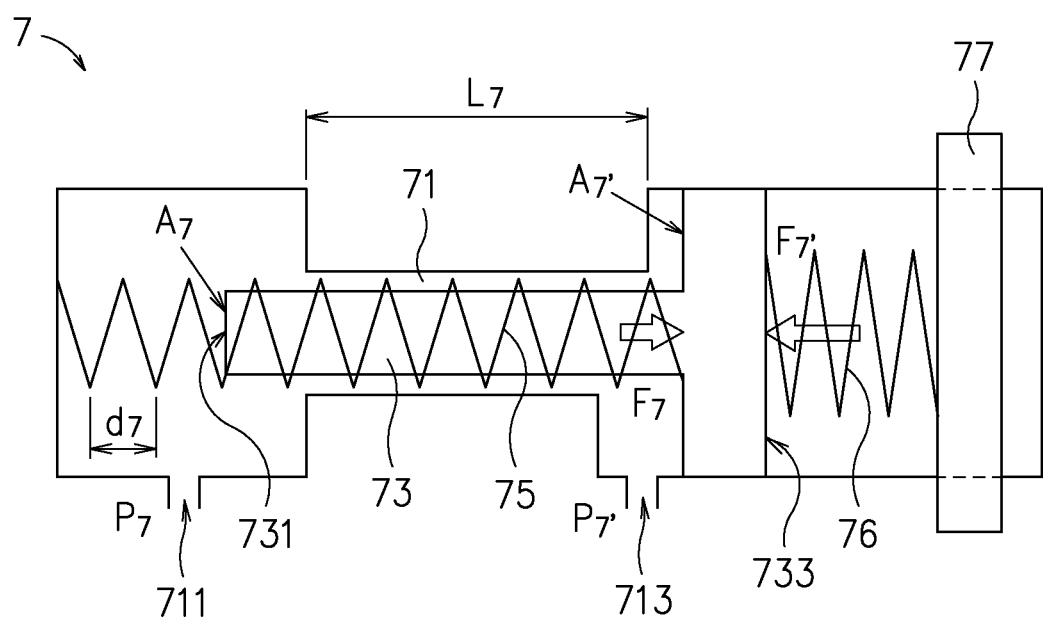
FIG. 11 is a schematic diagram showing a flow regulator, in accordance with the seventh exemplary embodiment of the present disclosure.

FIG. 11 is a schematic diagram showing a flow regulator 7 according to a seventh exemplary embodiment of the present disclosure. In FIG. 11, a flow regulator 7 comprises a channel 71, a rod 73, a first helical coil 75, a second helical coil 76, and an adjusting element 77. The channel 71 has a fluid inlet 711 and a fluid outlet 713 for a fluid flowing in and out of the flow regulator 7, respectively. The rod 73 has a fore end 731 and a rear end 733 opposite to each other. The rod 73 is inserted into the channel 71 such that the fore end 731 and the rear end 733 are both inside the channel 71, and the rod 73 is movable along an axial direction of the channel 71 (parallel to a straight line from the fore end 731 to the rear end 733 of the rod 73). The first helical coil 75 winds around the rod 73, and a helical pitch $d_7$ of the helical coil 75 is adjustable for regulating flow resistance of the fluid. The adjusting element 77 is fit on the channel 71, and closer to the rear end 733 than the fore end 731 of the rod 73.

Further, the channel 71 has a narrowed section, which falls in the area denoted by an effective regulating length $L_7$ in FIG. 11, where part of the helical coil 75 located therein substantially occupies an annular space between the rod 73 and inner wall of the channel 71. Since in the narrowed section (the area corresponding to $L_7$), there is not enough space between the rod 73 and the inner wall of the channel 71 for the fluid passing through, the fluid has to flow through the spacing in the helical coil 75 (defined by the helical pitch $d_7$), and the flow resistance of the fluid is thus affected by the dimension of the helical pitch $d_7$.

Furthermore, according to the seventh exemplary embodiment shown in FIG. 11, a cross sectional area of the rear end 733 is larger than effective cross sectional area of the fore end 731. To be specific, the rear end 733 of the rod 73 contacts the inner wall of the channel. There may be a seal (not shown), such as an O-ring, mounted on the rear end 733 of the rod 73 for coupling the rear end 733 to the channel 71, or the rear end 733 itself is designed to couple to the channel 71 tightly enough. Either way, the fluid will not flow to a space between the rear end 733 of the rod 73 and the adjusting element 77 in the channel 71. In this embodiment, the fluid flows into the channel 71 through the fluid inlet 711, passes through the spacing in the first helical coil 75 in the narrowed section (the area corresponding to $L_7$), and then flows out of the channel 71 through the fluid outlet 713 without flowing to the space between the rear end 733 of the rod 73 and the adjusting element 77 in the channel 71.

Moreover, as FIG. 11 shown, one end of the first helical coil 75 is connected to the inner wall of the channel 71, and the other end of the first helical coil 75 is connected to the rear end 733 of the rod 73. The second helical coil 76 is connected to the rear end 733 of the rod 73 at one end and to the adjusting element 77 at the other end. Therefore, the helical pitch $d_7$ of the first helical coil 75 may be adjusted by moving the adjusting element 77 toward or away from the rear end 733.

The present disclosure provides a flow regulator which is not only capable of regulating flow resistance of a fluid but also equipped with an automatic compensation function. In the seventh exemplary embodiment, the automatic compensation function is achieved by the dynamic relations among the movable rod 73, the first helical coil 75, and the second helical coil 76. In the following, the working principle of how to achieve the automatic compensation function will be explained along with FIG. 11.

Please refer to FIG. 11. When the flow regulator 7 is in equilibrium, forces applied to the rod 73 is balanced, and can be expressed as the following formula:

$$P_7 \times A_7 + P_{7'} \times A_{7'} + F_7 = F_{7'} \quad (7)$$

wherein $F_7$ is a first force provided by the first helical coil 75;

$F_{7'}$ is a second force provided by the second helical coil 76;

$P_7$ is an inlet pressure measured at the fluid inlet 711;

$P_{7'}$ is an outlet pressure measured at the fluid outlet 713;

$A_7$ is an effective area on which the inlet pressure $P_7$ is applied; and $A_{7'}$ is an effective area on which the outlet pressure $P_{7'}$ is applied.

Here, please be noted that the effective area $A_7$ may be regarded as the cross sectional area of the fore end 731 of the rod 73, and the effective area $A_{7'}$ may be regarded as the cross sectional area of the rear end 733 of the rod 73 minus the cross sectional area of the fore end 731 of the rod 73.

The first force $F_7$ from the first helical coil 75 and the second force $F_{7'}$ from the second helical coil 76 may be adjusted simply by respectively changing the helical pitches of the first helical coil 75 and the second helical coil 76. Further, since one side of the rear end 733 of the rod 73 is connected to the first helical coil 75, and the other side of the rear end 733 is connected to the second helical coil 76, the change of the helical pitch $d_7$ of the first helical coil 75 would result in moving the rear end 733 (and the whole rod 73) toward or away from the fluid outlet 713 and thus changing the helical pitch of the second helical coil 76; and vice versa.

In addition, from to the above formula (7), it is clearly that the outlet pressure $P_{7'}$ would be affected by the first force $F_7$ from the first helical coil 75 and the second force $F_{7'}$ from the second helical coil 76. Therefore, the outlet pressure $P_{7'}$ at the fluid outlet 713, where the fluid flows out of the channel 71, may be altered by changing the helical pitches of the first helical coil 75 or the second helical coil 76. On the other hand, when an pressure of a subsequent chamber (not shown) connected to the channel 71 through the fluid outlet 713 is changed and thus affecting the outlet pressure $P_{7'}$ at the fluid outlet 713, through the dynamic relations among the movable rod 73, the first helical coil 75, and the second helical coil 76, the flow resistance R is varied because of the alteration of the helical pitch $d_7$ of the first helical coil 75, and the effect causing by the pressure change in the subsequent chamber is automatic compensated consequently.

In the following, the operation of adjusting the helical pitch of the flow regulator and the operation demonstrating how the automatic compensation function of the flow regulator works in accordance with the fifth, sixth, and seventh exemplary embodiments of the present disclosure will be respectively described in details with reference to FIG. 12A to FIG. 17B.

Figure 12A:
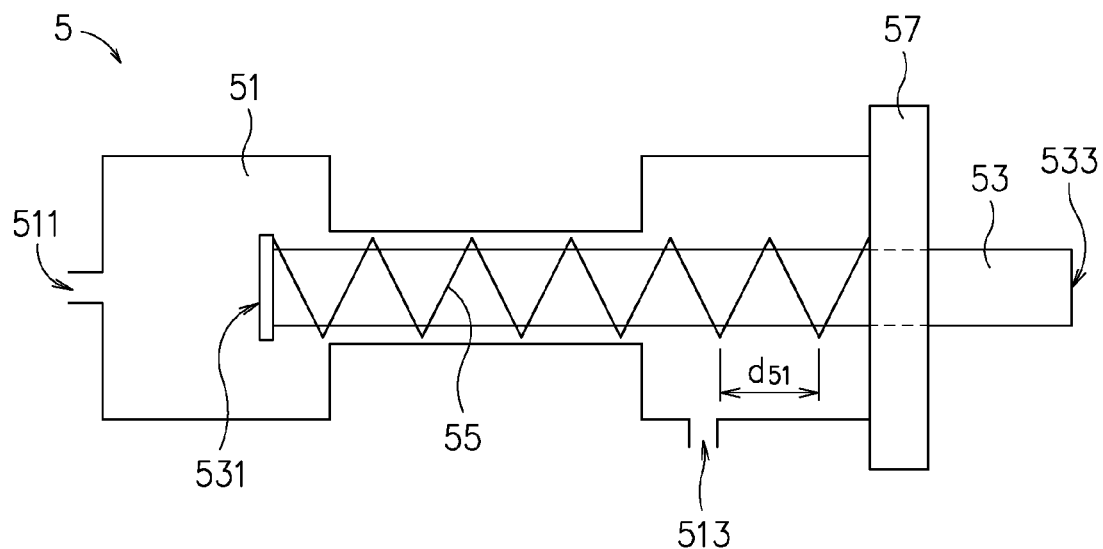
FIGS. 12A and 12B are schematic diagrams showing how to adjust a helical pitch of a helical coil of the flow regulator, in accordance with the fifth exemplary embodiment of the present disclosure.
Figure 12B:
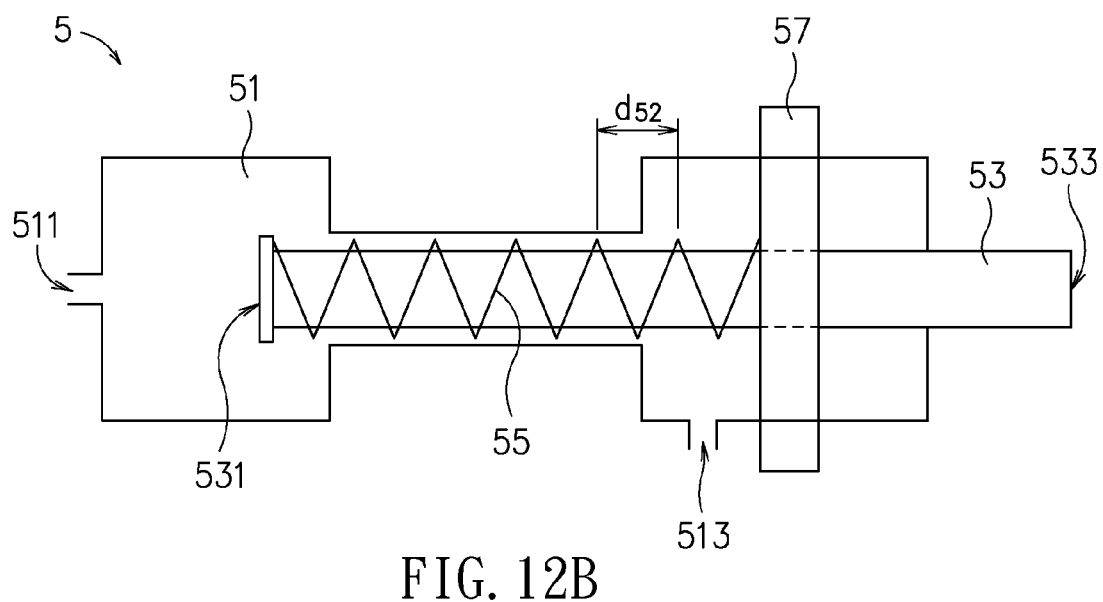

First, please refer to FIGS. 12A and 12B. The operation of adjusting the helical pitch $d_5$ of the flow regulator 5 is described below with these figures.

FIGS. 12A and 12B are schematic diagrams showing how to adjust the helical pitch $d_5$ of the flow regulator 5 by moving the adjusting element 57, in accordance with the fifth exemplary embodiment. Since one end of the helical coil 55 is connected to the fore end 531 of the rod 53, and the other end of the helical coil 55 is connected to the adjusting element 57, the helical pitch $d_5$ of the flow regulator 5 may be altered by the movement of the adjusting element 57.

In FIGS. 12A and 12B, the helical pitch $d_5$ of the helical coil 55 is respectively defined as $d_{51}$ and $d_{52}$. Compared with the condition shown in FIG. 12A, the adjusting element 57 in FIG. 12B is moved more into the channel 51 (in other words, the adjusting element 57 is moved toward the fore end 531 of the rod 53 and away from the rear end 533 of the rod 53). Therefore, the helical pitch $d_{52}$ in FIG. 12B would be smaller than the helical pitch $d_{51}$ in FIG. 12A. As the working principle set out before, the smaller the helical pitch $d_5$ is, the bigger the flow resistance R will be. Therefore, the flow resistance R in FIG. 12B is bigger than that in FIG. 12A. One the other hand, when a smaller flow resistance R in required, the adjusting element 57 may be moved more out of the channel 51 (in other words, the adjusting element 57 is moved away from the fore end 531 and toward the rear end 533 of the rod 53) than the adjusting element 57 in FIG. 12A does. In such circumstance, the helical pitch $d_5$ of the flow regulator 5 will be larger, and the smaller flow resistance R is achieved as a result.

Figure 13A:
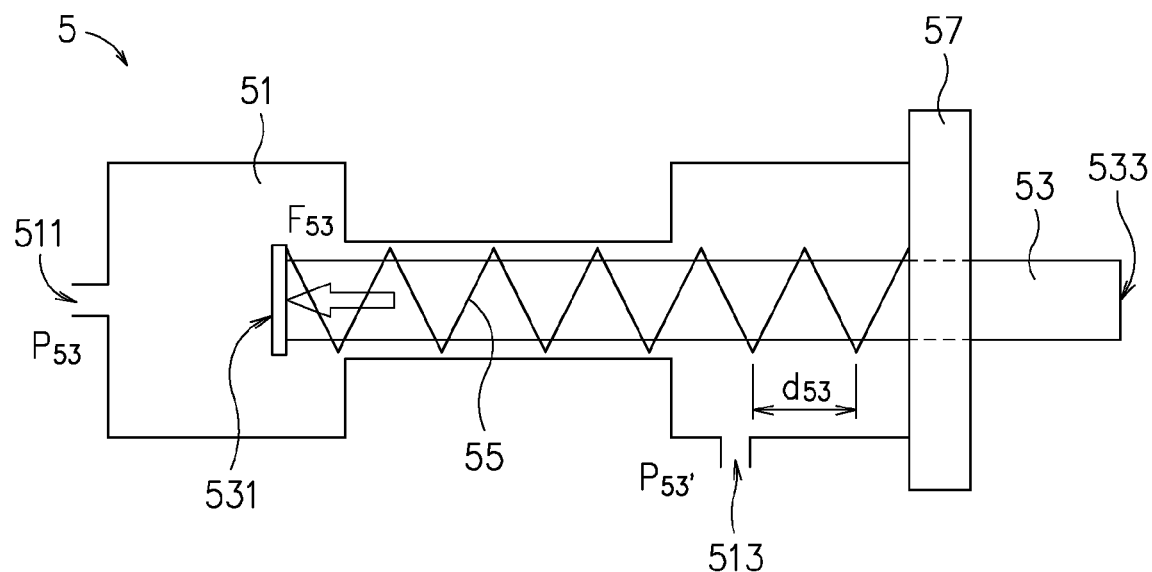
FIGS. 13A and 13B are a series of schematic diagrams showing how the helical pitch of the helical coil of the flow regulator varies automatically along with pressure change of an inlet pressure measured at a fluid inlet of a channel of the flow regulator, in accordance with the fifth exemplary embodiment of the present disclosure.
Figure 13B:
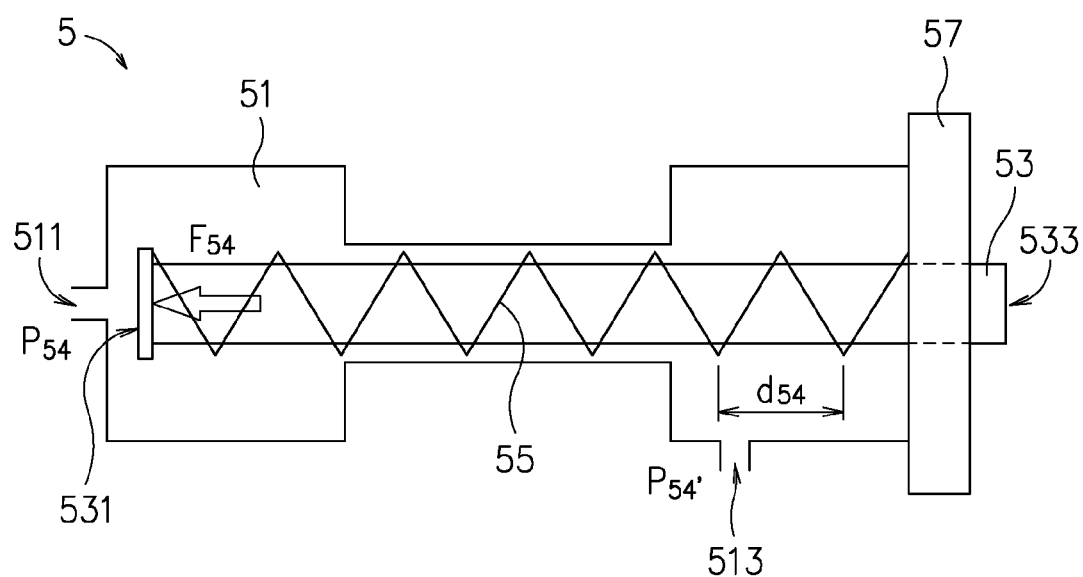

Now, please refer to FIGS. 13A and 13B. The operation demonstrating how the automatic compensation function of the flow regulator 5 works is described below with these figures.

In FIGS. 13A and 13B, the force $F_5$ provided by the helical coil 55 is respectively defined as $F_{53}$ and $F_{54}$, the helical pitch $d_5$ of the helical coil 55 is respectively defined as $d_{53}$ and $d_{54}$, the inlet pressure measured at the fluid inlet 511 of the channel 51 is respectively defined as $P_{53}$ and $P_{54}$, and the outlet pressure measured at the fluid outlet 513 of the channel 51 is respectively defined as $P_{53'}$ and $P_{54'}$.

FIGS. 13A and 13B are a series of schematic diagrams showing how the helical pitch $d_5$ of the helical coil 55 of the flow regulator 5 varies automatically along with the pressure change of the inlet pressure $P_5$ measured at the fluid inlet 511 of the channel 51, in accordance with the fifth exemplary embodiment of the present disclosure. Since the forces applied to the fore end 531 of the rod 53 are balanced and the operation of the flow regulator 5 follows previously mentioned formula (5): ($P_5 \times A_5 = F_5$), the rod 53 may move toward or away from the fluid inlet 511 as either of these forces changes.

FIGS. 13A and 13B shows how the rod 53 moves when the inlet pressure $P_{53}$ changes to $P_{54}$. To be more specific, when the pressure setting of the fluid source (not shown) connected to the flow regulator 5 through the fluid inlet 511 is decreased, the inlet pressure $P_{53}$ in FIG. 13A will decrease to $P_{54}$ in FIG. 12B (i.e. $P_{53} > P_{54}$). Since the inlet pressure $P_{53}$ decreases to $P_{54}$, the force $F_{54}$ in FIG. 13B becomes smaller than $F_{53}$ in FIG. 13A, according to formula (5). As a result, the rod 53 will be forced to move toward the fluid inlet 511, and the helical pitch $d_{54}$ of the helical coil 55 thus becomes larger (i.e. $d_{54} > d_{53}$), compared with the condition in FIG. 13A.

As the working principle set out before, the larger the helical pitch $d_5$ is, the smaller the flow resistance R will be. Therefore, the flow resistance R in FIG. 13B is smaller than in FIG. 13A. When the flow resistance R gets smaller, the flow rate Q and the overall pressure in the flow regulator 5 will become larger in an automatically compensating manner. Similarly, when the inlet pressure $P_5$ of the flow regulator 5 increases, the force $F_5$ provided by the helical coil 55 will becomes bigger and the helical pitch $d_5$ will get smaller; thus increasing the flow resistances R.

From the above description, it is clear that the flow resistance R of the flow regulator 5 can be varied automatically along with the change of the pressure setting of the fluid source (not shown) connected to the channel 51 through the fluid inlet 511 of the flow regulator 5, which in turn causes the flow rate Q and overall pressure of the flow regulator 5 to be changed in an automatically compensating manner.

Figure 14A:
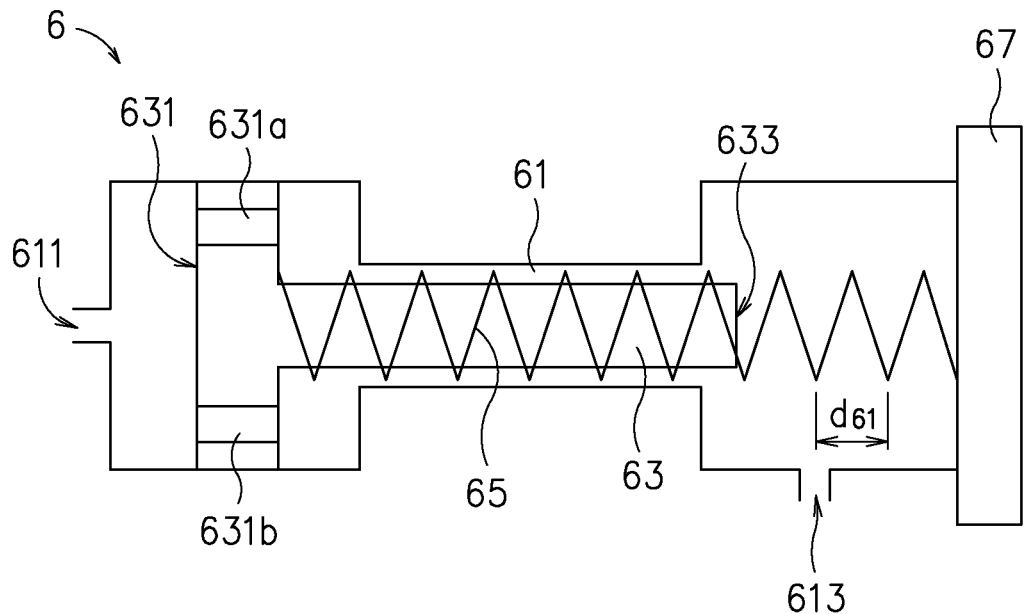
FIGS. 14A and 14B are schematic diagrams showing how to adjust a helical pitch of a helical coil of the flow regulator, in accordance with the sixth exemplary embodiment of the present disclosure.
Figure 14B:
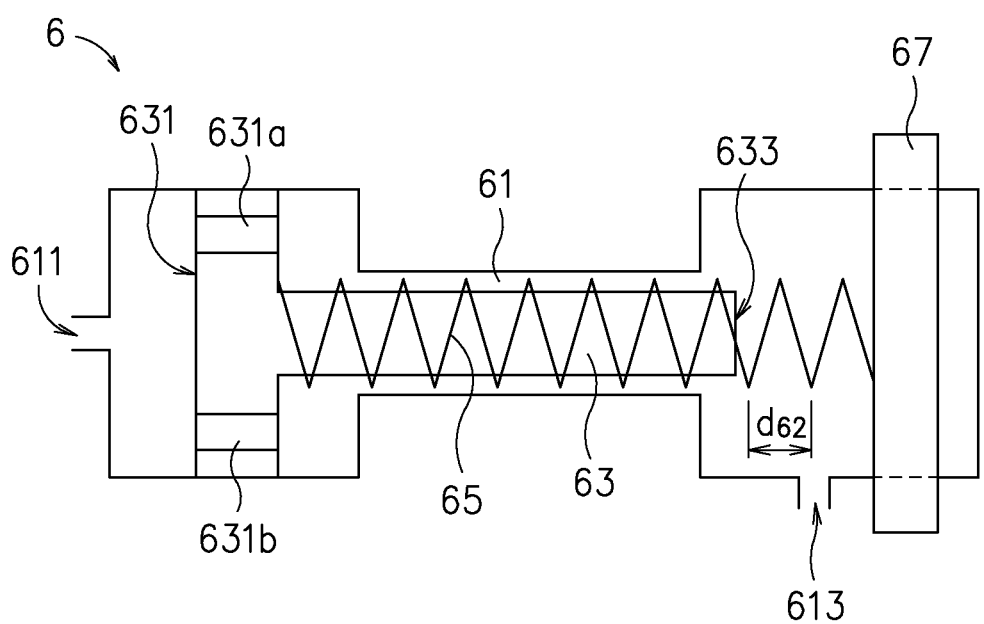

Next, please refer to FIGS. 14A and 14B. The operation of adjusting the helical pitch $d_6$ of the flow regulator 6 is described below with these figures.

FIGS. 14A and 14B are schematic diagrams showing how to adjust the helical pitch $d_6$ of the flow regulator 6 by moving the adjusting element 67, in accordance with the sixth exemplary embodiment. Since one end of the helical coil 65 is connected to the fore end 631 of the rod 63, and the other end of the helical coil 65 is connected to the adjusting element 67, the helical pitch $d_6$ of the flow regulator 6 may be altered by the movement of the adjusting element 67.

In FIGS. 14A and 14B, the helical pitch $d_6$ of the helical coil 65 is respectively defined as $d_{61}$ and $d_{62}$. Compared with the condition shown in FIG. 14A, the adjusting element 67 in FIG. 14B is moved more into the channel 61 (in other words, the adjusting element 67 is moved toward the rod 63). Therefore, the helical pitch $d_{62}$ in FIG. 14B would be smaller than the helical pitch $d_{61}$ in FIG. 14A. As the working principle set out before, the smaller the helical pitch $d_6$ is, the bigger the flow resistance R will be. Therefore, the flow resistance R in FIG. 14B is bigger than that in FIG. 14A. One the other hand, when a smaller flow resistance R in required, the adjusting element 67 may be moved more out of the channel 61 (in other words, the adjusting element 67 is moved away from the rod 63) than the adjusting element 67 in FIG. 14A does. In such circumstance, the helical pitch $d_6$ of the flow regulator 6 will be larger, and the smaller flow resistance R is achieved as a result.

Figure 15A:
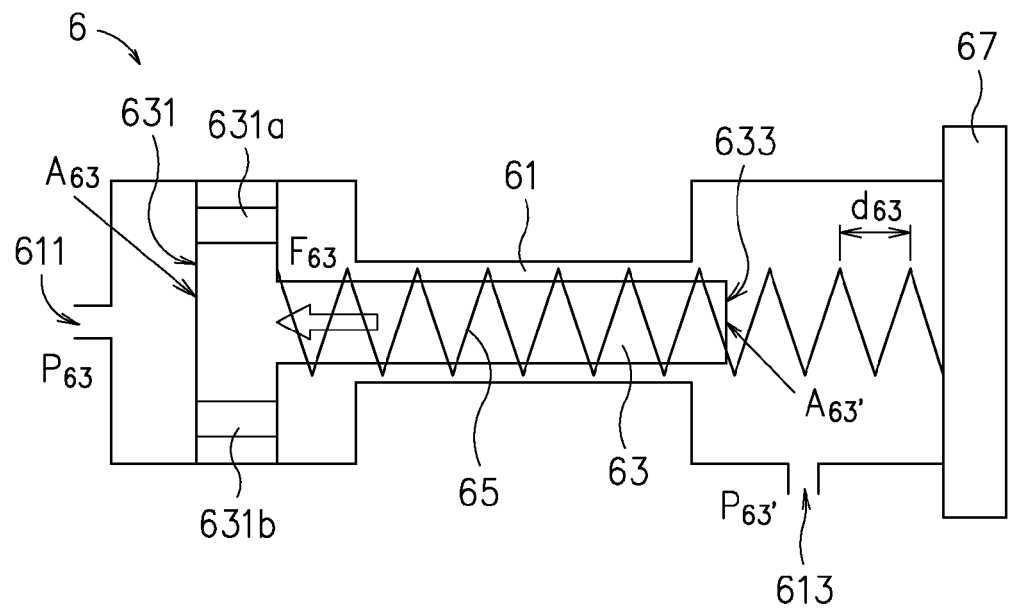
FIGS. 15A and 15B are a series of schematic diagrams showing how the helical pitch of the helical coil of the flow regulator varies automatically along with pressure change of an outlet pressure measured at a fluid outlet of a channel of the flow regulator, in accordance with the sixth exemplary embodiment of the present disclosure.
Figure 15B:
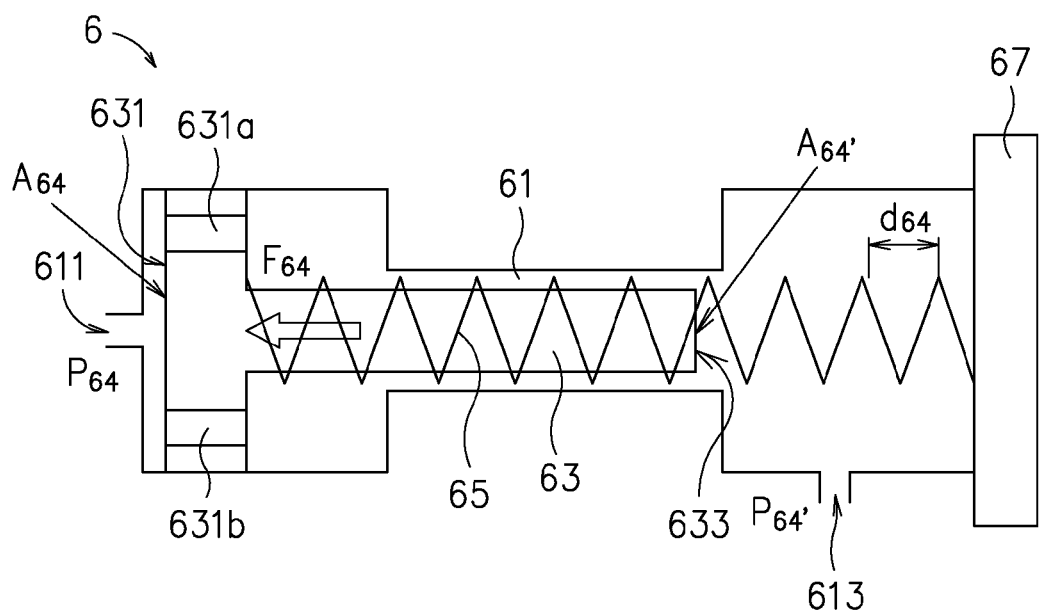

Now, please refer to FIGS. 15A and 15B. The operation demonstrating how the automatic compensation function of the flow regulator 6 works is described below with these figures.

In FIGS. 15A and 15B, the force $F_6$ provided by the helical coil 65 is respectively defined as $F_{63}$ and $F_{64}$, the helical pitch $d_6$ of the helical coil 65 is respectively defined as $d_{63}$ and $d_{64}$, the inlet pressure $P_6$ measured at the fluid inlet 611 of the channel 61 is respectively defined as $P_{63}$ and $P_{64}$, and the outlet pressure $P_c$ measured at the fluid outlet 613 of the channel 61 is respectively defined as $P_{63'}$ and $P_{64'}$.

FIGS. 15A and 15B are a series of schematic diagrams showing how the helical pitch $d_6$ of the helical coil 65 of the flow regulator 6 varies automatically along with the pressure change of the outlet pressure $P_c$ measured at the fluid outlet 613 of the channel 61, in accordance with the sixth exemplary embodiment of the present disclosure. Since the forces applied to the rod 63 are balanced and the operation of the flow regulator 6 follows previously mentioned formula (6): $(F_6+P_{6'}\times A_{6'}=P_6\times A_6)$, the rod 63 may move toward or away from the fluid inlet 611 as any of these forces changes.

FIGS. 15A and 15B shows how the rod 63 moves when the outlet pressure $P_{63'}$ changes to $P_{64'}$. To be more specific, when the pressure of a subsequent chamber (not shown) connected to the flow regulator 6 through the fluid outlet 613 is increased, the outlet pressure $P_{63'}$ in FIG. 15A will increase to $P_{64'}$ in FIG. 15B (i.e. $P_{64'}>P_{63'}$). In such circumstance, the rod 63 will be forced to move more toward the fluid inlet 611, the helical pitch $d_{64}$ of the helical coil 65 thus becomes larger (i.e. $d_{64}>d_{63}$) and the force $F_{64}$ provided by the helical coil 65 will thus become smaller (i.e. $F_{64}<F_{63}$), compared with the condition in FIG. 15A.

As the working principle set out before, the larger the helical pitch $d_6$ is, the smaller the flow resistance R will be. Therefore, the flow resistance R in FIG. 15B is smaller than in FIG. 15A. When the flow resistance R gets smaller, the flow rate Q and the overall pressure in the flow regulator 6 will become larger in an automatically compensating manner. Similarly, when the outlet pressure $P_{6'}$ of the flow regulator 6 decreases, the rod 63 will be forced to move more away from the fluid inlet 611, and the helical pitch $d_6$ will get smaller (and the force $F_6$ provided by the helical coil 65 will become bigger); thus increasing the flow resistances R.

From the above description, it is clear that the flow resistance R of the flow regulator 6 can be varied automatically along with the pressure change in the subsequent chamber (not shown) connected to the channel 61 through the fluid outlet 613 of the flow regulator 6, which in turn causes the flow rate Q and overall pressure of the flow regulator 6 to be changed in an automatically compensating manner.

Figure 16A:
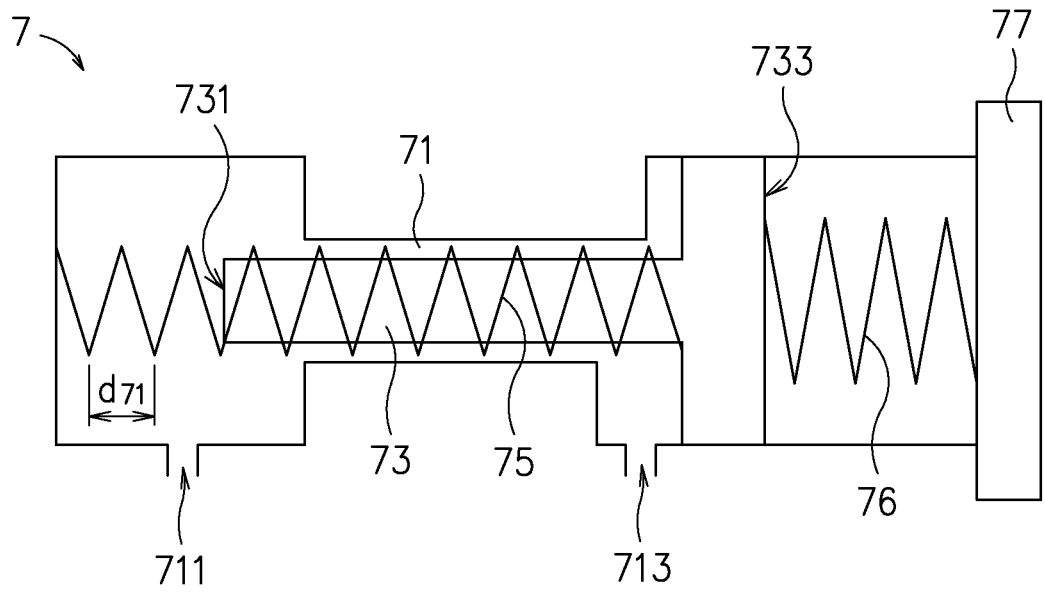
FIGS. 16A and 16B are schematic diagrams showing how to adjust a helical pitch of a first helical coil of the flow regulator, in accordance with the seventh exemplary embodiment of the present disclosure.
Figure 16B:
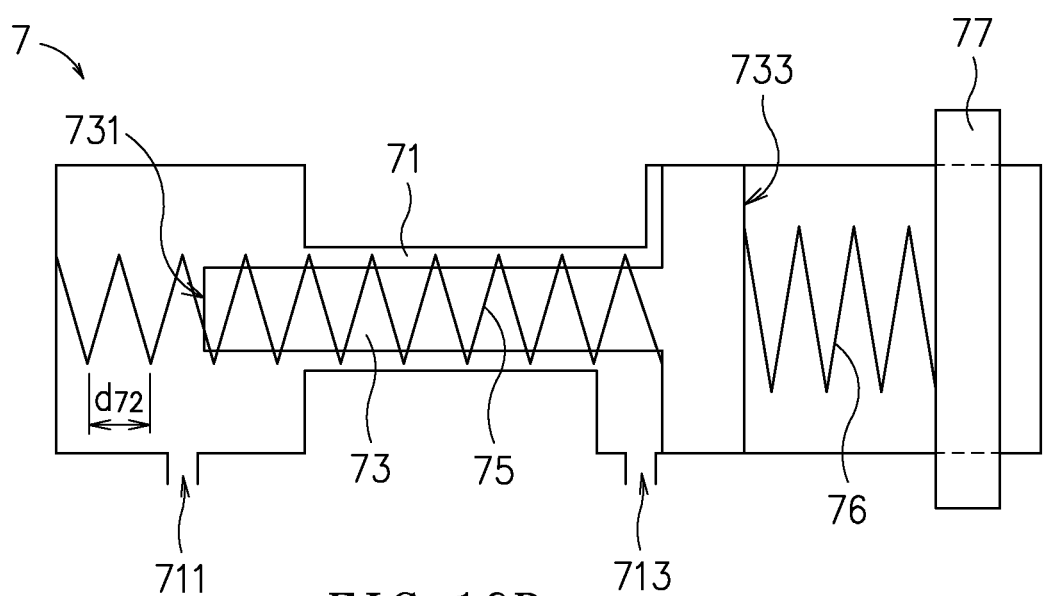

Next, please refer to FIGS. 16A and 16B. The operation of adjusting the helical pitch $d_7$ of the flow regulator 7 is described below with these figures.

FIGS. 16A and 16B are schematic diagrams showing how to adjust the helical pitch $d_7$ of the first helical coil 75 of the flow regulator 7 by moving the adjusting element 77, in accordance with the seventh exemplary embodiment. Since the rod 73 may move along the axial direction of the channel 71, the first helical coil 75 is connected to the inner wall of the channel 71 and the rear end 733 of the rod 73, and the second helical coil 76 is connected to the rear end 733 of the rod 73 and the adjusting element 77, the helical pitch $d_7$ of the flow regulator 7 may be altered by the movement of the adjusting element 77.

In FIGS. 16A and 16B, the helical pitch $d_7$ of the first helical coil 75 is respectively defined as $d_{71}$ and $d_{72}$. Compared with the condition shown in FIG. 16A, the adjusting element 77 in FIG. 16B is moved more into the channel 71 (in other words, the adjusting element 77 is moved more toward the rod 73). Therefore, the helical pitch $d_{72}$ in FIG. 16B would be smaller than the helical pitch $d_{71}$ in FIG. 16A. As the working principle set out before, the smaller the helical pitch $d_7$ is, the bigger the flow resistance R will be. Therefore, the flow resistance R in FIG. 16B is bigger than that in FIG. 16A. One the other hand, when a smaller flow resistance R in required, the adjusting element 77 may be moved more out of the channel 71 (in other words, the adjusting element 77 is moved more away from the rod 73) than the adjusting element 77 in FIG. 16A does. In such circumstance, the helical pitch $d_7$ of the flow regulator 7 will be larger, and the smaller flow resistance R is achieved as a result.

Figure 17A:
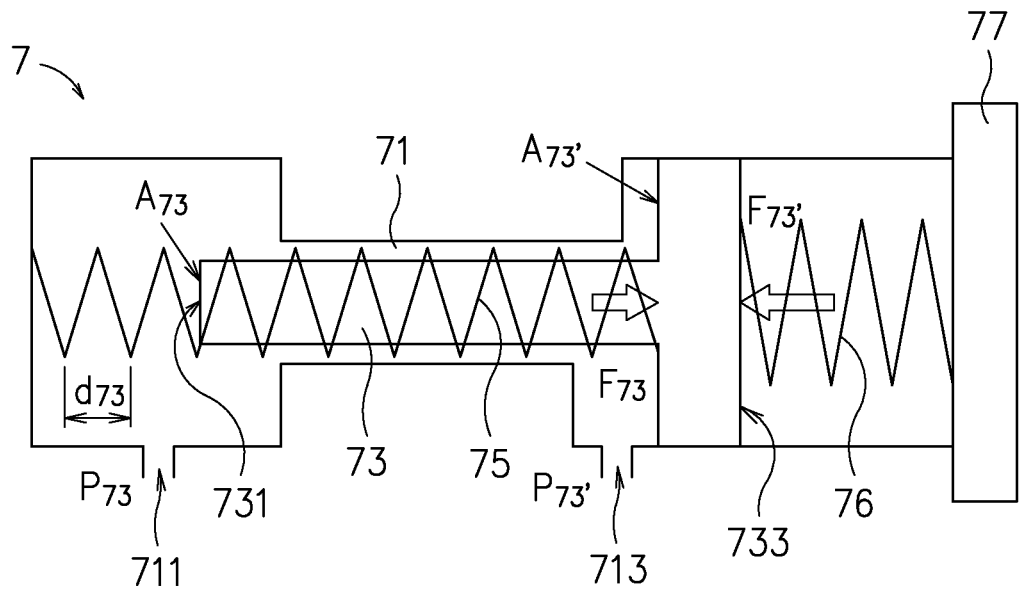
FIGS. 17A and 17B are a series of schematic diagrams showing how the helical pitch of the first helical coil of the flow regulator varies automatically along with pressure change of an outlet pressure measured at a fluid outlet of a channel of the flow regulator, in accordance with the seventh exemplary embodiment of the present disclosure.
Figure 17B:
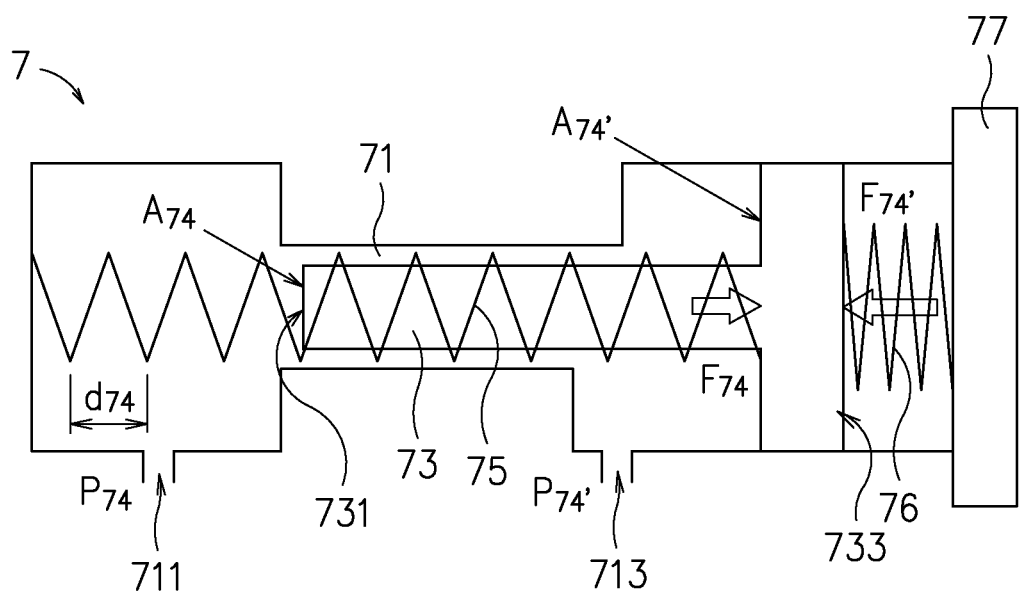

Now, please refer to FIGS. 17A and 17B. The operation demonstrating how the automatic compensation function of the flow regulator 7 works is described below with these figures.

In FIGS. 17A and 17B, the first force $F_7$ provided by the first helical coil 75 is respectively defined as $F_{73}$ and $F_{74}$, the second force $F_{7'}$ provided by the second helical coil 76 is respectively defined as $F_{73'}$ and $F_{74'}$, the helical pitch $d_7$ of the first helical coil 75 is respectively defined as $d_{73}$ and $d_{74}$, the inlet pressure $P_7$ measured at the fluid inlet 711 of the channel 71 is respectively defined as $P_{73}$ and $P_{74}$, and the outlet pressure $P_{7'}$ measured at the fluid outlet 713 of the channel 71 is respectively defined as $P_{73'}$ and $P_{74'}$.

FIGS. 17A and 17B are a series of schematic diagrams showing how the helical pitch $d_7$ of the first helical coil 75 of the flow regulator 7 varies automatically along with the pressure change of the outlet pressure $P_{7'}$ measured at the fluid outlet 713 of the channel 71, in accordance with the seventh exemplary embodiment of the present disclosure. Since the forces applied to the rod 73 are balanced and the operation of the flow regulator 7 follows previously mentioned formula (7): $(P_7\times A_7+P_{7'}\times A_{7'}+F_{7'}=F_7)$, the rod 73 may move toward or away from the adjusting element 77 as any of these forces changes.

FIGS. 17A and 17B shows how the rod 73 moves when the outlet pressure $P_{73'}$ changes to $P_{74'}$. To be more specific, when the pressure of a subsequent chamber (not shown) connected to the flow regulator 7 through the fluid outlet 713 is increased, the outlet pressure $P_{73'}$ in FIG. 17A will increase to $P_{74'}$ in FIG. 17B (i.e. $P_{74'}>P_{73'}$). In such circumstance, the rod 73 will be forced to move toward the adjusting element 77, and the helical pitch $d_{74}$ of the first helical coil 75 thus becomes larger (i.e. $d_{74}>d_{73}$), compared with the condition in FIG. 17A. As a result, the first force $F_7$ provided by the first helical coil 75 decreases (i.e. $F_{74}<F_{73}$), the second force $F_{7'}$ provided by the second helical coil 76 increases (i.e. $F_{74'}>F_{73'}$), and the final position of the rod 73 is determined by the force difference between the first and the second force $F_7$ and $F_{7'}$.

As the working principle set out before, the larger the helical pitch $d_7$ is, the smaller the flow resistance R will be. Therefore, the flow resistance R in FIG. 17B is smaller than in FIG. 17A. When the flow resistance R gets smaller, the flow rate Q and the overall pressure in the flow regulator 7 will become larger in an automatically compensating manner. Similarly, when the outlet pressure $P_{7'}$ of the flow regulator 7 decreases, the helical pitch $d_7$ will get smaller, and the flow resistances R thus increases.

From the above description, it is clear that the flow resistance R of the flow regulator 7 can be varied automatically along with the pressure change in the subsequent chamber (not shown) connected to the channel 71 through the fluid outlet 713 of the flow regulator 7, which in turn causes the flow rate Q and overall pressure of the flow regulator 7 to be changed in an automatically compensating manner.

It will be apparent to those skilled in the art that various modifications and variations can be made to the structure of the disclosed embodiments without departing from the scope or true spirit of the present disclosure. In view of the foregoing, it is intended that the present disclosure covers modifications and variations of this disclosure provided that they fall within the scope of the following claims and their equivalents.

What is claimed is:

1. A flow regulator, comprising:
   a channel, having a fluid inlet and a fluid outlet for a fluid flowing in and out of the flow regulator, respectively;
   a rod, having a fore end and a rear end opposite to each other, the fore end being inside the channel, and the rear end being outside the channel;
   a first helical coil, winding around the rod, a helical pitch of the first helical coil being adjustable for regulating flow resistance of a fluid;
   a slide block, fit on the rod and movable toward or away from the fluid outlet along the rod; and
   a force provider, providing a force to the slide block,
   wherein the channel further has a narrowed section where part of the first helical coil substantially occupies an annular space between the rod and an inner wall of the channel, such that the fluid is configured to flow through a spacing in the first helical coil; and
   wherein the slide block comprises a regulating side, one end of the first helical coil is connected to the fore end of the rod, and the other end of the first helical coil is connected to the regulating side of the slide block.

2. The flow regulator of claim 1, wherein the helical pitch of the first helical coil is adjustable by the rod moving along an axial direction of the channel.

3. The flow regulator of claim 1, wherein
   the slide block further comprises:
   a compensating side opposite to the regulating side; and
   the force provider comprises:
   an adjusting element, fit on the rod and movable toward or away from the rear end of the rod; and
   a second helical coil, winding around the rod, one end of the second helical coil being connected to the compensating side of the slide block, and the other end of the second helical coil being connected to the adjusting element.

4. The flow regulator of claim 1, wherein
   the slide block further comprises:
   a compensating side opposite to the regulating side; and
   the force provider comprises:
   a controllable pressure regulator in fluid communication with the channel through an opening, which is closer to the compensating side than the regulating side of the slide block.

5. A flow regulator, comprising:
   a channel, having a fluid inlet and a fluid outlet for a fluid flowing in and out of the flow regulator, respectively;
   a rod, having a fore end and a rear end opposite to each other, the fore end being inside the channel;
   a helical coil, winding around the rod, a helical pitch of the helical coil being adjustable for regulating flow resistance of a fluid; and
   an adjusting element, fit on the channel and being closer to the rear end of the rod than the fore end,
   wherein the channel has a narrowed section where part of the helical coil substantially occupies an annular space between the rod and an inner wall of the channel, such that the fluid is configured to flow through a spacing in the helical coil, and the helical pitch of the helical coil is adjustable by a movement of the adjusting element toward or away from the rear end of the rod; and
   wherein the adjusting element further fits on the rod, one end of the helical coil is connected to the fore end of the rod, and the other end of the helical coil is connected to the adjusting element.

6. The flow regulator of claim 5, wherein the rod is movable along an axial direction of the channel.

7. The flow regulator of claim 5, wherein the rear end of the rod is inside the channel, the fore end of the rod has passages for the fluid passing through and has an cross sectional area larger than the rear end does.

\* \* \* \* \*